(12) United States Patent
Wei

(10) Patent No.: US 12,108,461 B2
(45) Date of Patent: *Oct. 1, 2024

(54) METHODS AND APPARATUSES FOR RANDOM ACCESS PROCEDURE IN MEDIUM ACCESS CONTROL LAYER

(71) Applicant: FG Innovation Company Limited, New Territories (HK)

(72) Inventor: Chia-Hung Wei, Taipei (TW)

(73) Assignee: FG Innovation Company Limited, New Territories (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,250

(22) Filed: May 3, 2023

(65) Prior Publication Data

US 2023/0269785 A1    Aug. 24, 2023

Related U.S. Application Data

(63) Continuation of application No. 17/944,590, filed on Sep. 14, 2022, now Pat. No. 11,696,341, which is a continuation of application No. 17/091,626, filed on Nov. 6, 2020, now Pat. No. 11,582,807.

(60) Provisional application No. 62/932,187, filed on Nov. 7, 2019.

(51) Int. Cl.
*H04W 74/0833* (2024.01)
*H04L 1/1812* (2023.01)
(Continued)

(52) U.S. Cl.
CPC ....... *H04W 74/0833* (2013.01); *H04L 1/1819* (2013.01); *H04W 24/08* (2013.01);
(Continued)

(58) Field of Classification Search
CPC ............. H04W 74/0833; H04W 24/08; H04W 72/042; H04W 72/0453; H04W 76/11;
(Continued)

(56) References Cited

U.S. PATENT DOCUMENTS 11,265,856 B2    3/2022    Takeda et al.
2019/0207737 A1    7/2019    Babaei et al.
(Continued)

FOREIGN PATENT DOCUMENTS

WO    2019026157    2/2019

OTHER PUBLICATIONS

3GPP TSG RAN WG1 Meeting #98bis ;R1-1910003, Source: ZTE , Chongqing, China, Oct. 14-20, 2019, (Year: 2019).*
(Continued)

*Primary Examiner* — Mohammed S Chowdhury
(74) *Attorney, Agent, or Firm* — JCIPRNET

(57) ABSTRACT

A method performed by a UE for implementing a random access procedure is provided. The method transmits a MSGA, monitoring an MSGB-RNTI within an MSGB time window starting from an earliest symbol of an earliest PDCCH occasion after the MSGA transmission. The method receives the MSGB in a first slot. The MSGB includes a success RAR that contains a HARQ Feedback Timing Indicator, a Physical Uplink Control Channel (PUCCH) Resource Indicator, and a UE Contention Resolution Identity. The method determines, by a MAC entity of the UE, to instruct a lower layer to transmit a HARQ feedback in a second slot in response to the reception of the success RAR. The method delivers, by the MAC entity, the HARQ Feedback Timing Indicator and the PUCCH Resource Indicator to the lower layer, and performs, by the lower layer, a HARQ feedback delivery on an uplink (UL) resource.

14 Claims, 13 Drawing Sheets

(51) Int. Cl.
*H04W 24/08* (2009.01)
*H04W 72/0453* (2023.01)
*H04W 72/23* (2023.01)
*H04W 76/11* (2018.01)
*H04W 76/27* (2018.01)
*H04W 80/02* (2009.01)

(52) U.S. Cl.
CPC ....... *H04W 72/0453* (2013.01); *H04W 72/23* (2023.01); *H04W 76/11* (2018.02); *H04W 76/27* (2018.02); *H04W 80/02* (2013.01)

(58) Field of Classification Search
CPC ..... H04W 76/27; H04W 80/02; H04W 72/23; H04W 74/002; H04L 1/1819; H04L 1/1822; H04L 1/1854
See application file for complete search history.

(56) References Cited

U.S. PATENT DOCUMENTS

2020/0329504 A1* 10/2020 Kunt ................. H04W 74/0833
2021/0014011 A1* 1/2021 Xiong .................. H04L 1/1854
2021/0051736 A1* 2/2021 Jeon ...................... H04W 76/18
2022/0295542 A1* 9/2022 Zhao ................. H04W 74/0833

OTHER PUBLICATIONS

3GPP TS 38.321 V15.7.0 (Sep. 2019) (Year: 2019).*
3GPP TSG RAN WG1 #98; R1-1909775, Prague, Czech Republic, Aug. 26-30, 2019; Source: Nokia, Nokia Shanghai Bell, Title: Feature lead summary#4 on 2 step RACH procedures (Year: 2019).*
Motorola Mobility et al., "2-step RACH procedure", 3GPP TSG RAN WG1 #98bis, R1-1911035, Oct. 14-20, 2019, pp. 1-6.
Nokia et al., "On 2-step RACH procedure", 3GPP TSG RAN WG1 #98, R1-1908342, Aug. 26-30, 2019, pp. 1-30.
Huawei et al., "Discussion on 2-step RACH procedure", 3GPP TSG RAN WG1 Meeting #97, R1-1906051, May 13-17, 2019, pp. 1-12.
Samsung. "2 step RA: HARQ Feedback for MsgB", 3GPP TSG-RAN2 107, R2-1908805, Aug. 26-30, 2019, pp. 1-2.
"Search Report of Europe Counterpart Application", issued on Sep. 18, 2023, p. 1-p. 12.
ZTE, Sanechips, "Remaining issues of 2-step RACH procedures", 3GPP TSG RAN WG1 Meeting #98bis, R1-1910003, Oct. 14-20, 2019, pp. 1-19.
"Office Action of Europe Counterpart Application", issued on May 14, 2024, p. 1-p. 6.

* cited by examiner

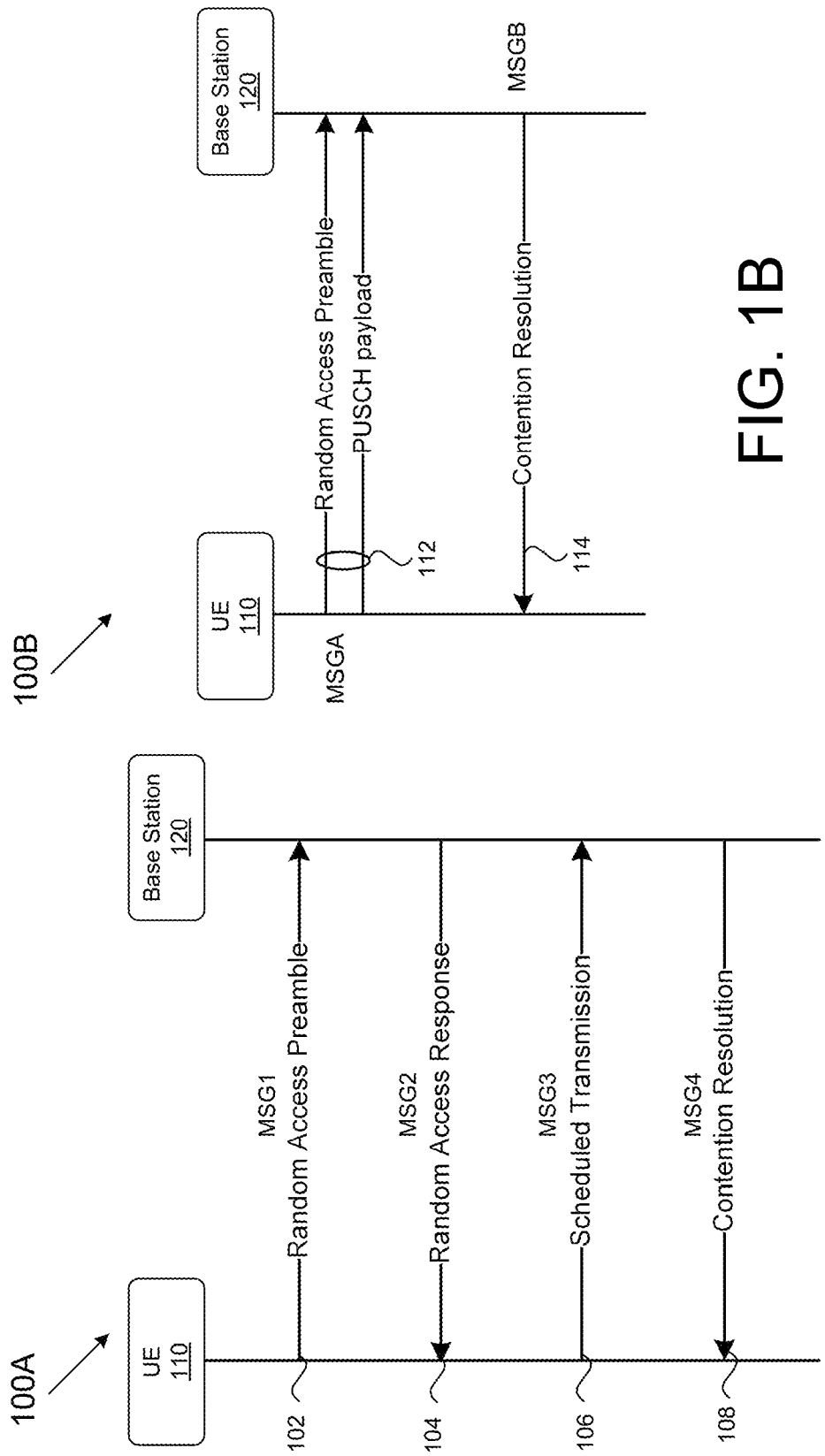

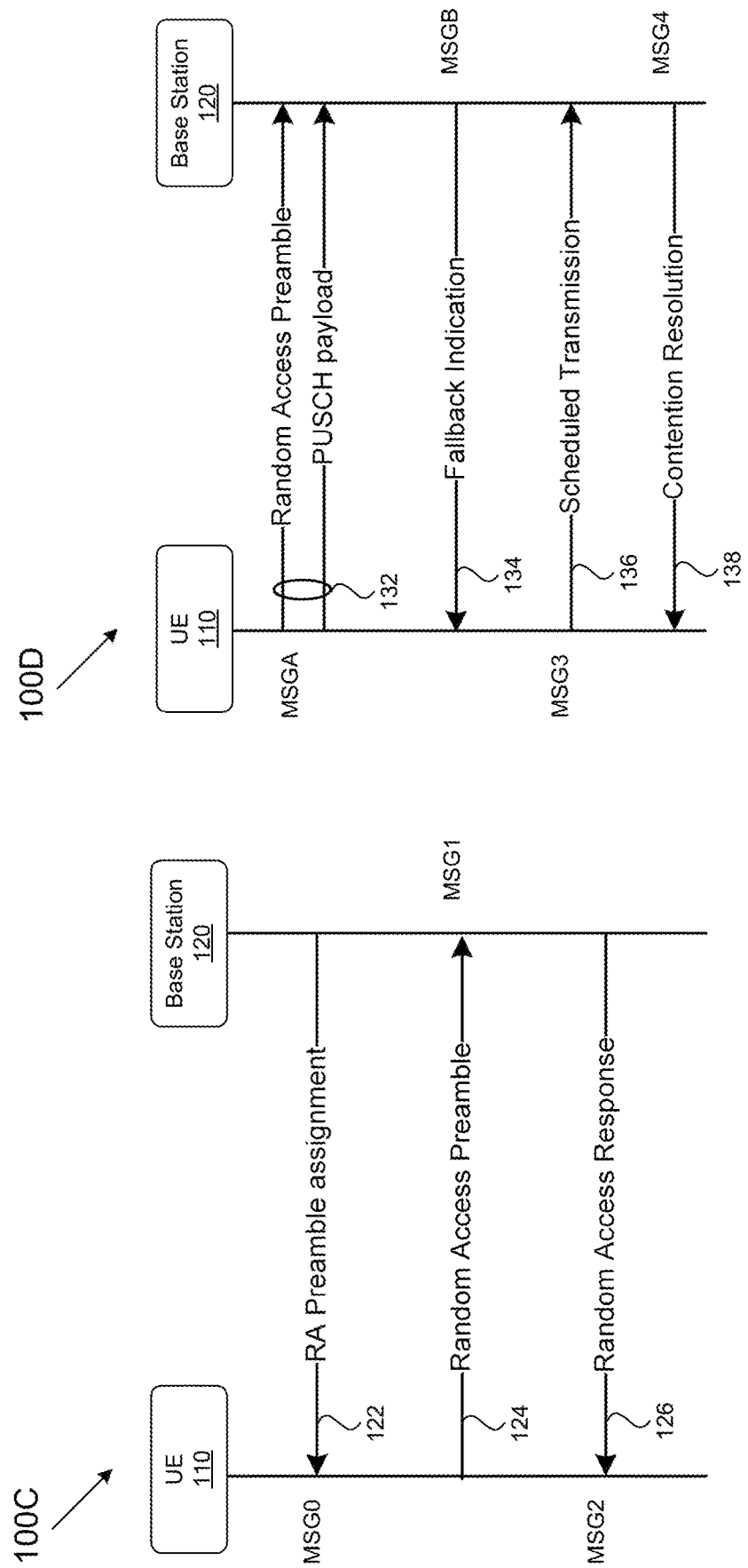

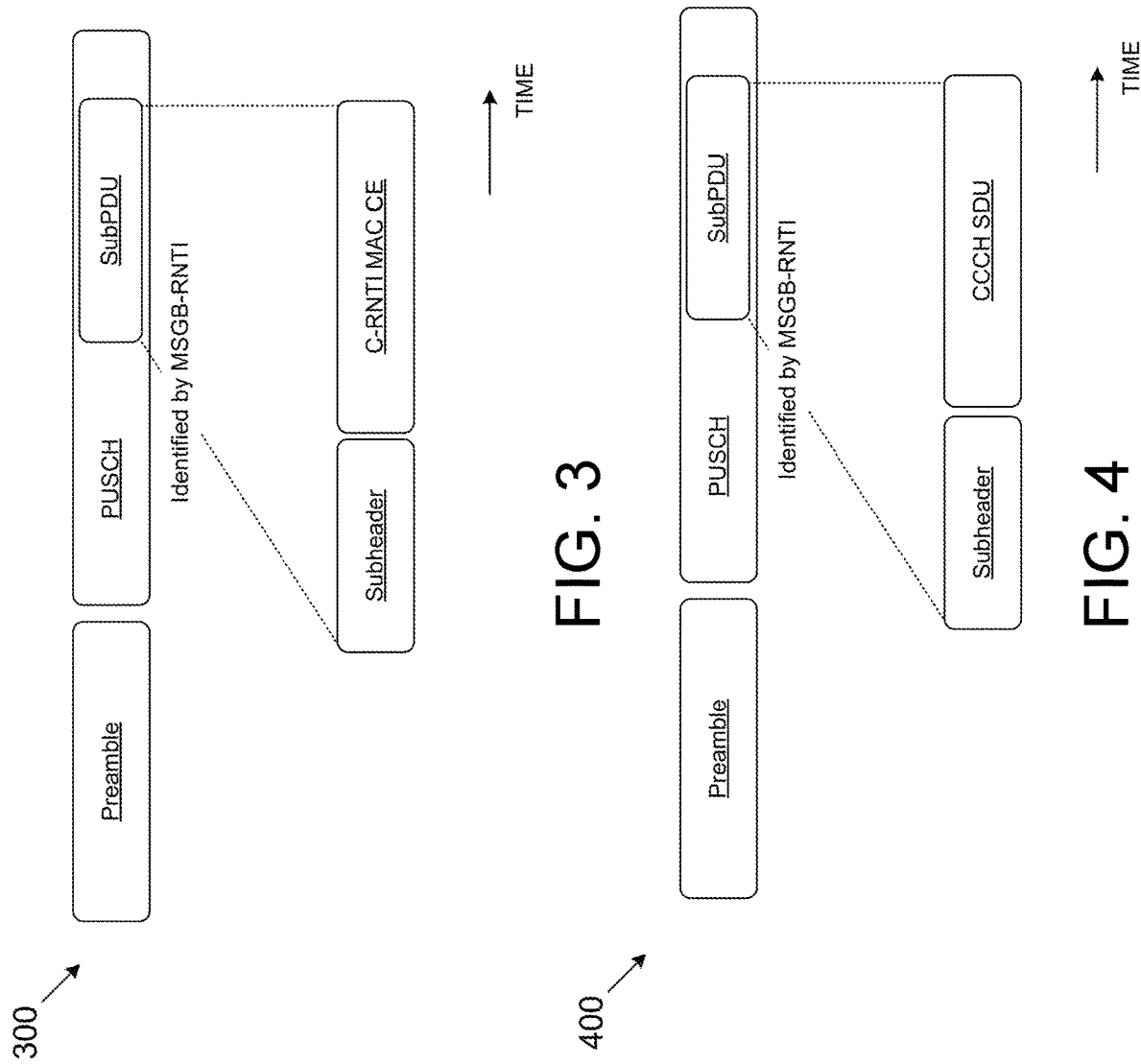

METHODS AND APPARATUSES FOR RANDOM ACCESS PROCEDURE IN MEDIUM ACCESS CONTROL LAYER

CROSS-REFERENCE TO RELATED APPLICATION(S)

The present application is a continuation application of U.S. patent application Ser. No. 17/944,590, filed on Sep. 14, 2022. The prior U.S. patent application Ser. No. 17/944,590 is a continuation application of U.S. patent application Ser. No. 17/091,626, filed on Nov. 6, 2020, which claims the benefit of and priority to U.S. Provisional Patent Application Ser. No. 62/932,187, filed on Nov. 7, 2019. The contents of all above-identified applications are hereby incorporated herein fully by reference for all purposes.

FIELD

The present disclosure generally relates to wireless communications, and more specifically, relates to methods and apparatuses for two-step random access procedure in the Medium Access Control (MAC) Layer.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses for two-step random access procedure in the MAC Layer.

According to a first aspect of the present disclosure, a method performed by a User Equipment (UE) for a 2-step random access (RA) procedure including a message A (MSGA) and a message B (MSGB) is provided. The method includes: transmitting the MSGA of the 2-step random access procedure; monitoring a MSGB-Radio Network Temporary Identity (RNTI) within a MSGB window, the MSGB window starting from an earliest symbol of an earliest Physical Downlink Control Channel (PDCCH) occasion after an end of the MSGA transmission; receiving, in response to the MSGA, the MSGB in a first slot, the MSGB including a success random access response (RAR), the success RAR containing a Hybrid Automatic Repeat reQuest (HARQ) Feedback Timing Indicator, a Physical Uplink Control Channel (PUCCH) Resource Indicator, and a UE Contention Resolution Identity; determining, by a Media Access Control (MAC) entity of the UE, to instruct a lower layer to transmit a HARQ feedback in a second slot in response to the reception of the success RAR, the second slot indicated by the HARQ Feedback Timing Indicator; delivering, by the MAC entity of the UE, the HARQ Feedback Timing Indicator and the PUCCH Resource Indicator to the lower layer; and performing, by the lower layer, a HARQ feedback delivery on an uplink (UL) resource within the second slot determined by the HARQ Feedback Timing Indicator and the PUCCH Resource Indicator.

In an implementation of the first aspect, the MSG A contains a Common Control Channel (CCCH) MAC Service Data Unit (SDU).

In another implementation of the first aspect, the HARQ feedback is transmitted when the UE Contention Resolution Identity in a MAC sub-Packet Data Unit (PDU) of the success RAR matches the CCCH MAC SDU.

In yet another implementation of the first aspect, the HARQ feedback is transmitted on an UL bandwidth part (BWP).

In yet another implementation of the first aspect, the UL resource corresponds to one of a list of PUCCH resource candidates indicated by the PUCCH Resource Indicator.

In yet another implementation of the first aspect, the list of PUCCH resource candidates is preconfigured by a radio resource control (RRC) configuration, the list of PUCCH resource candidates being associated with the UL BWP.

In yet another implementation of the first aspect, the second slot is separated from the first slot by a slot offset in a time domain, and the slot offset is indicated by the HARQ Feedback Timing Indicator.

In yet another implementation of the first aspect, the lower layer is a physical (PHY) layer of the UE.

According to a second aspect of the present disclosure, a user equipment (UE) configured to perform a 2-step random access (RA) procedure including a message A (MSGA) and a message B (MSGB) is provided. The UE includes one or more non-transitory computer-readable media having computer-executable instructions embodied thereon, and at least one processor coupled to the one or more non-transitory computer-readable media, and configured to execute the computer-executable instructions to: transmit, by transmit circuitry, the MSGA of the 2-step random access procedure; monitor a MSGB-Radio Network Temporary Identity (RNTI) within a MSGB window, the MSGB window starting from an earliest symbol of an earliest Physical Downlink Control Channel (PDCCH) occasion after an end of the MSGA transmission; receive, by reception circuitry, the MSGB in a first slot in response to the MSGA, the MSGB including a success random access response (RAR), the success RAR containing a Hybrid Automatic Repeat reQuest (HARQ) Feedback Timing Indicator, a Physical Uplink Control Channel (PUCCH) Resource Indicator, and a UE Contention Resolution Identity; determine, by a Media Access Control (MAC) entity, to instruct a lower layer to transmit a HARQ feedback in a second slot in response to the reception of the success RAR, the second slot indicated by the HARQ Feedback Timing Indicator; deliver, by the MAC entity of the UE, the HARQ Feedback Timing Indicator and the PUCCH Resource Indicator to the lower layer; and perform, by the lower layer, a HARQ feedback delivery on an uplink (UL) resource within the second slot determined by the HARQ Feedback Timing Indicator and the PUCCH Resource Indicator.

In an implementation of the second aspect, the MSG A contains a Common Control Channel (CCCH) MAC Service Data Unit (SDU).

In another implementation of the second aspect, the HARQ feedback is transmitted when the UE Contention Resolution Identity in a MAC sub-Packet Data Unit (PDU) of the success RAR matches the CCCH MAC SDU.

In yet another implementation of the second aspect, the HARQ feedback is transmitted on an UL bandwidth part (BWP).

In yet another implementation of the second aspect, the UL resource corresponds to one of a list of PUCCH resource candidates indicated by the PUCCH Resource Indicator.

In yet another implementation of the second aspect, the list of PUCCH resource candidates is preconfigured by a radio resource control (RRC) configuration, the list of PUCCH resource candidates being associated with the UL BWP.

In yet another implementation of the second aspect, the second slot is separated from the first slot by a slot offset in a time domain, and the slot offset is indicated by the HARQ Feedback Timing Indicator.

In yet another implementation of the second aspect, the lower layer is a physical (PHY) layer of the UE.

According to a third aspect of the present disclosure, a method performed by a User Equipment (UE) for a 2-step random access (RA) procedure including a message A (MSGA) and a message B (MSGB) is provided. The method includes: transmitting the MSGA of the 2-step RA procedure, the MSGA including a Common Control Channel (CCCH) Media Access Control (MAC) Service Data Unit (SDU); monitoring an MSGB-Radio Network Temporary Identity (RNTI) within an MSGB time window, the MSGB time window starting from an earliest symbol of an earliest Physical Downlink Control Channel (PDCCH) occasion after an end of the MSGA transmission; receiving, in response to the MSGA, the MSGB in a first slot, the MSGB including a success random access response (RAR), the success RAR containing a Hybrid Automatic Repeat reQuest (HARQ) Feedback Timing Indicator, a Physical Uplink Control Channel (PUCCH) Resource Indicator, and a UE Contention Resolution Identity; determining, by a MAC entity of the UE, to instruct a lower layer to transmit a HARQ feedback in response to the reception of the success RAR, wherein the HARQ feedback is transmitted in a second slot determined by the HARQ Feedback Timing Indicator, and wherein the second slot is separated from the first slot by an offset, the offset including a timing offset value determined from a list of PUCCH resource offset candidates; delivering, by the MAC entity of the UE, the HARQ Feedback Timing Indicator and the PUCCH Resource Indicator to the lower layer; and transmitting, by the lower layer, the HARQ feedback on an uplink (UL) resource within the second slot in response to the UE Contention Resolution Identity in a MAC sub-Protocol Data Unit (subPDU) of the success RAR matching the CCCH MAC SDU, wherein the UL resource is determined by the PUCCH Resource Indicator and the UL resource corresponding to one of the list of PUCCH resource candidates indicated by the PUCCH Resource Indicator, and wherein the list of PUCCH resource candidates is associated with a UL bandwidth part (BWP).

In an implementation of the third aspect, the HARQ feedback is transmitted on the UL BWP.

In another implementation of the third aspect, the list of PUCCH resource candidates is preconfigured by a radio resource control (RRC) configuration.

In yet another implementation of the third aspect, the lower layer includes a physical (PHY) layer of the UE.

According to a fourth aspect of the present disclosure, a user equipment (UE) configured to perform a 2-step random access (RA) procedure including a message A (MSGA) and a message B (MSGB) is provided. The UE includes one or more non-transitory computer-readable media having computer-executable instructions embodied thereon, and at least one processor coupled to the one or more non-transitory computer-readable media, and configured to execute the computer-executable instructions to cause the UE to: transmit the MSGA of the 2-step RA procedure, the MSGA including a Common Control Channel (CCCH) Media Access Control (MAC) Service Data Unit (SDU); monitor an MSGB-Radio Network Temporary Identity (RNTI) within an MSGB time window, the MSGB time window starting from an earliest symbol of an earliest Physical Downlink Control Channel (PDCCH) occasion after an end of the MSGA transmission; receive, in response to the MSGA, the MSGB in a first slot, the MSGB including a success random access response (RAR), the success RAR containing a Hybrid Automatic Repeat reQuest (HARQ) Feedback Timing Indicator, a Physical Uplink Control Channel (PUCCH) Resource Indicator, and a UE Contention Resolution Identity; determine, by a MAC entity of the UE, to instruct a lower layer to transmit a HARQ feedback in response to the reception of the success RAR, wherein the HARQ feedback is transmitted in a second slot determined by the HARQ Feedback Timing Indicator, and wherein the second slot is separated from the first slot by an offset, the offset including a timing offset value determined from a list of PUCCH resource offset candidates; deliver, by the MAC entity of the UE, the HARQ Feedback Timing Indicator and the PUCCH Resource Indicator to the lower layer; and transmit, by the lower layer, the HARQ feedback on an uplink (UL) resource within the second slot, the UL resource being determined by the PUCCH Resource Indicator when the UE Contention Resolution Identity in a MAC sub-Protocol Data Unit (subPDU) of the success RAR matches the CCCH MAC SDU, the UL resource corresponding to one of the list of PUCCH resource candidates indicated by the PUCCH Resource Indicator, wherein the list of PUCCH resource candidates is associated with a UL bandwidth part (BWP).

In an implementation of the fourth aspect, the HARQ feedback is transmitted on the UL BWP.

In another implementation of the fourth aspect, the list of PUCCH resource candidates is preconfigured by a radio resource control (RRC) configuration.

In yet another implementation of the fourth aspect, the lower layer comprises a physical (PHY) layer of the UE.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

FIG. 1A illustrates a 4-step CBRA procedure, in accordance with an example implantation of the present disclosure.

FIG. 1B illustrates a 2-step CBRA procedure, in accordance with an example implantation of the present disclosure.

FIG. 1C illustrates a CFRA procedure, in accordance with an example implantation of the present disclosure.

FIG. 1D illustrates a fallback from a 2-step RA to a 4-step RA procedure, in accordance with an example implantation of the present disclosure.

FIG. 3 illustrates a schematic diagram of a payload of a MSGA transmission on a PUSCH having a C-RNTI MAC CE, in accordance with an example implementation of the present disclosure.

FIG. 4 illustrates a schematic diagram of a payload of a MSGA transmission on a PUSCH having a MAC SDU from a CCCH, in accordance with an example implementation of the present disclosure.

DESCRIPTION

Figure 2:
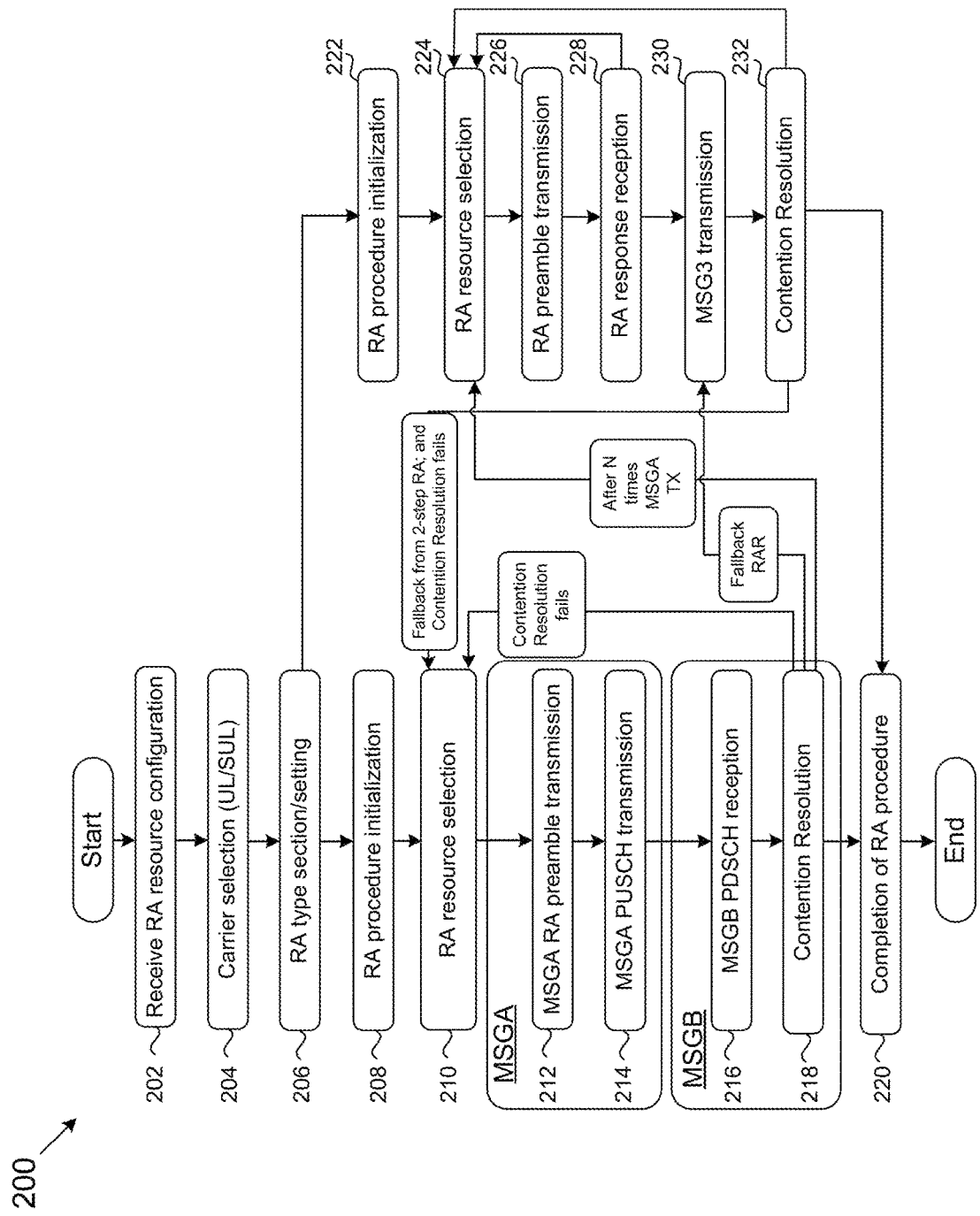
FIG. 2 illustrates a flowchart of a method by a UE for a random access procedure where both 2-step and 4-step RA random access resources are configured by a base station, according to an example implementation of the present application.

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

The terms mentioned in the present disclosure are defined as follows. Unless otherwise specified, the terms in the present disclosure have the following meanings.

| Abbreviation | Full name |
| --- | --- |
| 3GPP | 3rd Generation Partnership Project |
| 5G | 5th generation |
| ACK | Acknowledge |
| AS | Access Stratum |
| BA | Bandwidth Adaptation |
| BF | Beam Failure |
| BFD | Beam Failure Detection |
| BFI | Beam Failure Instance |
| BFR | Beam Failure Recovery |
| BFRQ | Beam Failure Recovery Request |
| BFRR | Beam Failure Recovery Response |
| BS | Base Station |
| BSR | Buffer Status Report |
| BWP | Band Width Part |
| CA | Carrier Aggregation |
| CC | Component Carriers |
| CE | Control Element |
| CG | Cell Group |
| CSI | Channel State Information |
| CSI-RS | Channel State Information based Reference Signal |
| CQI | Channel Quality Indicator |
| C-RNTI | Cell Radio Network Temporary Identifier |
| CS-RNTI | Configured Scheduling Radio Network Temporary Identifier |

-continued

| Abbreviation | Full name |
|---|---|
| DRB | Data Radio Bearer |
| DTCH | Dedicated Traffic Channel |
| DL | Downlink |
| DCI | Downlink Control Information |
| DL-SCH | Downlink Shared Channel |
| DRX | Discontinuous Reception |
| EN-DC | E-UTRA NR Dual Connect |
| ID | Identity |
| L1 | Layer 1 |
| L2 | Layer 2 |
| LCH | Logical Channel |
| LCID | Logical Channel Identity |
| LTE | Long Term Evolution |
| MAC | Medium Access Control |
| MAC CE | MAC Control Element |
| MCG | Master Cell Group |
| MIMO | Multi-input Multi-output |
| MSC-C-RNTI | Modulation Coding Scheme Cell Radio Network Temporary Identifier |
| Msg | Message |
| MSGA | Message A |
| MSGB | Message B |
| MSGB-RNTI | Message B Radio Network Temporary Identifier |
| NACK | Negative Acknowledge |
| NBI | New Beam Identification |
| NDI | New Data Indicator |
| NR | New RAT/Radio |
| NW | Network |
| PCell | Primary Cell |
| PDCCH | Physical Downlink Control Channel |
| PDSCH | Physical Downlink Shared Channel |
| PDCP | Packet Data Convergence Protocol |
| PDU | Protocol Data Unit |
| PHY Layer | Physical Layer |
| PRACH | Physical Random Access Channel |
| PSCell | Primary SCell |
| PUCCH | Physical Uplink Control Channel |
| PUSCH | Physical Uplink Shared Channel |
| QoS | Quality of Service |
| RA | Random Access |
| RACH | Random Access Channel |
| RAR | Random Access Response |
| RF | Radio Frequency |
| RNTI | Radio Network Temporary Identifier |
| RRC | Radio Resource Control |
| RS | Reference Signal |
| RSRP | Reference Signal Received Power |
| Rx | Reception |
| SCell | Secondary Cell |
| SCG | Secondary Cell Group |
| SDAP | Service Data Adaptation Protocol |
| SDU | Service Data Unit |
| SINR | Signal-to-Noise and Interference Ratio |
| SR | Scheduling Request |
| SRS | Sounding Reference Signal |
| SSB | Synchronization Signal Block |
| SpCell | Special Cell |
| SLIV | Start and Length Indicator Value |
| SUL | Supplementary UL |
| TAG | Timing Advance Group |
| TB | Transport Block |
| TRP | Transmission/Reception Point |
| TS | Technical Specification |
| Tx | Transmission |
| UCI | Uplink Control Information |
| UE | User Equipment |
| UL | Uplink |
| UL-SCH | Uplink Shared Channel |

Persons skilled in the art will immediately recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the SGC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of an MCG or a SCG may be referred to as a Special Cell (SpCell). A PCell may refer to the SpCell of an MCG. A Primary SCG Cell (PSCell) may refer to the SpCell of an SCG. MCG may refer to a group of serving cells associated with the Master Node (MN), including the SpCell and optionally one or more SCells. An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

In various implementations of the present disclosure, a cell may be a radio network object that can be uniquely identified by a User Equipment from a (cell) identification that is broadcast over a geographical area from one UTRAN Access Point. A Cell is either FDD or TDD mode.

In various implementations of the present disclosure, for a UE in RRC_CONNECTED not configured with CA/DC, there is only one serving cell comprising of the primary cell. For a UE in RRC_CONNECTED configured with CA/DC the term 'serving cells' is used to denote the set of cells comprising of the Special Cell(s) and all secondary cells.

In various implementations of the present disclosure, in Carrier Aggregation (CA), two or more Component Carriers (CCs) are aggregated. A UE may simultaneously receive or transmit on one or multiple CCs depending on its capabilities. CA is supported for both contiguous and non-contiguous CCs. When CA is deployed frame timing and SFN are aligned across cells that can be aggregated. The maximum number of configured CCs for a UE is 16 for DL and 16 for UL. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore always consists of one PCell and one or more SCells.

In various implementations of the present disclosure, a HARQ is a functionality that ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ process.

In various implementations of the present disclosure, a HARQ-ACK information bit value of 0 represents a negative acknowledgement (NACK) while a HARQ-ACK information bit value of 1 represents a positive acknowledgement (ACK).

In various implementations of the present disclosure, the MAC entity can setup one or more timers for different purposes, for example, for triggering uplink signaling retransmission or limiting some uplink signaling retransmission period. A timer is running once it is started, until it is stopped or until it expires; otherwise it is not running. A timer can be started if it is not running or restarted if it is running. A timer is always started or restarted from its initial value, where the initial value can be (but is not limited to) configured by the base station via downlink RRC signaling.

In various implementations of the present disclosure, a subset of the total cell bandwidth of a cell is referred to as a BWP and BA is achieved by configuring the UE with BWP(s) and telling the UE which of the configured BWPs is currently the active one. To enable BA on the PCell, the base station configures the UE with UL and DL BWP(s). To enable BA on SCells in case of CA, the base station configures the UE with DL BWP(s) at least (i.e. there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

In various implementations of the present disclosure, for DL transmission, the base station can dynamically allocate resources to UEs via the C-RNTI/MCS-C-RNTI/CS-RNTI on PDCCH(s). A UE always monitors the PDCCH(s) in order to find possible assignments when its downlink reception is enabled (activity governed by DRX when configured) . When CA is configured, the same C-RNTI applies to all serving cells.

In various implementations of the present disclosure, PDCCH(s) can be used to schedule DL transmissions on PDSCH(s) and UL transmissions on PUSCH(s).

In various implementations of the present disclosure, for a Time Alignment Timer, RRC configures the initial value of the timer. The timer is for the maintenance of UL time alignment. Wherein the timeAlignmentTimer is per timing advance group maintained. The timer controls how long the MAC entity considers the Serving Cells belonging to the associated TAG to be uplink time aligned.

In various implementations of the present disclosure, a Start and Length Indicator Value (SLIV) is used for the time domain allocation for PUSCH(s)/PDSCH(s). It defines the start symbol and the number of consecutive symbols for the PUSCH/PDSCH allocation.

In various implementations of the present disclosure, data from the upper layer (e.g., the MAC layer) given to the physical layer is basically referred as transport block.

It should be understood that the terms, definitions and abbreviations disclosed in the present disclosure are either imported from existing documentation (ETSI, ITU or elsewhere) or newly created by 3GPP experts whenever a need for precise vocabulary was identified.

I. Types of Random Access Procedure

In the 3rd Generation Partnership Project (3GPP) next generation cellular wireless communication system (e.g., a 5th Generation (5G) New Radio wireless communication system), the following types of random access procedures will be supported: a 4-step contention based random access (CBRA) procedure, a 2-step CBRA procedure, and a contention free random access (CFRA) procedure.

FIG. 1A illustrates a 4-step CBRA procedure, in accordance with an example implantation of the present disclosure. As illustrated in FIG. 1A, diagram 100A includes a UE 110 and a base station (e.g., a gNB) 120. As shown in FIG. 1A, the 4-step contention-based random access procedure may start by the UE 110 sending, in action 102, a Random Access Preamble (Msg1) to the base station 120. The UE 110 may send the RA preamble to the base station 120 on a Physical Random Access Channel (PRACH) in the uplink. In response, in action 104, the base station 120 may send a Random Access Response (RAR) (Msg2) to the UE 110. The RAR may be generated by a MAC entity and transmitted on a Downlink Shared Channel (DL-SCH). The RAR, transmitted in action 104 may include an RA-preamble identifier, Timing Alignment information for the primary Timing Advanced Group (pTAG), initial UL grant, and assignment of Temporary Cell-Radio Network Temporary Identity (C-RNTI). After receiving the RAR, the UE 110 may send, in action 106, a first scheduled UL transmission (Msg3), for example, on an Uplink Shared Channel (UL-SCH) to the base station 120. After the base station 120 receives the first scheduled UL transmission, the base station may send, in action 108, a Contention Resolution message (Msg4) to the UE 110 on the DL.

In an RA procedure, upon receiving a RAR or Msg2 (e.g., in action 104), if the RAR contains a MAC sub-Protocol Data Unit (subPDU) with an RA preamble identifier that is associated with the transmitted preamble (e.g., when the identifier matches the preamble's index), the RAR reception may be considered as successful. That is, a RAR, which is a MAC PDU, may include one or more MAC subPDUs. A MAC subPDU may have a subheader part and a payload part. In some of the present implementations, the MAC subheader in the RAR may include an RA preamble identifier (e.g., RAPID) that is associated with the RA preamble index. That is, the RA preamble identifier may match the preamble index associated with the preamble for the UE to determine that the received RAR is associated with the sent preamble.

After the UE determines that the RAR reception is successful, the MAC layer (e.g., in the UE) may indicate the received UL grant to the lower layers to transmit the Msg3 (e.g., in action 106). Once the Msg3 is transmitted, the MAC entity may start a timer (e.g., the ra-ContentionResolutionTimer) and restart the timer (e.g., the ra-ContentionResolutionTimer) at each Hybrid Automatic Repeat reQuest (HARM) retransmission (e.g., in the first symbol after the end of the Msg3 transmission). An RA procedure may be considered as successfully completed when the contention resolution (e.g., in Msg4) is successfully performed in action 108. For example, when the UE Contention Resolution identity in the MAC Control Element (CE) matches the Common Control Channel (CCCH) Service Data Unit (SDU) transmitted in the Msg3, or other conditions defined in the 3GPP technical specification (e.g., TS 38.321) are met, then the contention resolution is considered successful. However, if the timer (e.g., the ra-ContentionResolutionTimer) expires, the contention resolution may be considered not successful if none of the successfully completed conditions (e.g., matching of the UE identifiers, or other conditions defined in the 3GPP TS 38.321) is satisfied. The content of the 3GPP TS 38.321 is hereby incorporated by reference in its entirety.

FIG. 1B illustrates a 2-step CBRA procedure, in accordance with an example implantation of the present disclosure. As illustrated in FIG. 1B, a diagram 100B includes a UE 110 and a base station (e.g., a gNB) 120. As shown in FIG. 1B, the 2-step contention-based random access procedure may start by the UE 110 sending a MSGA to the base station 120 in action 112.

As illustrated in FIG. 1B, in a 2-step CBRA procedure, the MSGA may include a preamble on a PRACH and a payload on a PUSCH. After transmitting MSGA, the UE may monitor for a response (e.g., a MSGB) from the network within a configured window. If a contention resolution is successful upon receiving the network response (e.g., the MSGB) in action 114, the UE may end the random access procedure as illustrated in FIG. 1B.

FIG. 1C illustrates a contention free random access (CFRA) procedure, in accordance with an example implantation of the present disclosure. As illustrated in diagram 100C, the base station may transmit an RA preamble assignment (e.g., MSG0) in action 122. In action 124, the UE 110 may transmit a random access preamble based on the RA preamble assignment received in action 122. In action 126, the base station 120 may transmit a random access response (e.g., in MSG2).

FIG. 1D illustrates another CBRA procedure, in accordance with an example implantation of the present disclosure.

As shown in FIG. 1D, the CBRA procedure may start by the UE 110 sending a MSGA to the base station 120 in action 132. In the present implementation, a fallback indication is received in the MSGB in action 134. Then, the UE 110 may perform a MSG3 (e.g., MSG3 in the 4-step RA procedure) transmission in action 136, then monitor the contention resolution (e.g., MSG 4 in the 4-step RA procedure) in action 138, as shown in FIG. 1D.

In the implementation shown in FIG. 1D, if contention resolution is not successful after MSG3 (re)transmission(s), the UE may go back to MSGA transmission. If the 2-step random access procedure is not successfully completed after a configured number of MSGA transmissions, UE may switch to the 4-step CBRA procedure (e.g., going back to MSG1).

For random access in a serving cell configured with SUL, the network can explicitly signal which carrier to use (UL or SUL). Otherwise, the UE may select an SUL carrier if and only if the measured quality of the DL is lower than a broadcast threshold. The UE may perform carrier selection before selecting between the 2-step and 4-step random access procedures. Once started, all uplink transmissions of the random access procedure remain on the selected carrier.

II. Random Access Procedure Operations

FIG. 2 illustrates a flowchart of a method by a UE for a random access procedure where both 2-step and 4-step RA random access resources are configured by a base station (e.g., a gNB), according to an example implementation of the present application.

As illustrated in flowchart 200, in action 202, the UE receives RA related configuration(s) from gNB via RACH-ConfigCommon, RACH-ConfigDedicated, RACH-Config-Generic, RA-Prioritization and/or any other information element (IE) which may be contained in broadcast RRC message and/or unicast RRC message.

The RA related configuration may include (but not limit to only include):
rsrp-ThresholdSSB-SUL: an RSRP threshold for the selection between the NUL carrier and the SUL carrier;
rsrp-ThresholdSSB-2stepCBRA: an RSRP threshold for selection of 2-step random access;
msgATransMax: a maximum number of times a UE can transmit MSGA transmission. The UE should fallback to 4-step random access after msgATransMax times MSGA transmission;
msgB-ResponseWindow: the time window to monitor MSGB (i.e., RA response(s));
beamFailureRecoveryTimer_2StepRA: A Timer for beam failure recovery timer. Upon expiration of the timer the UE does not use CFRA for BFR. Value in millisecond (ms). Upon UE trigger a RA for BFR and the UE select 2-step RA type, the UE starts the timer.

In action 204, the UE performs (UL) carrier selection. The UE measures the pathloss of downlink reference signal which pre-configured to associate with UL and SUL. The UE selects the SUL carrier for performing Random Access procedure if the RSRP of the downlink pathloss reference is less than the rsrp-ThresholdSSB-SUL. Otherwise, the UE selects normal UL carrier.

In action 206, the UE performs RA type selection/setting. The UE may select the 2-step RA if the rsrp-ThresholdSSB-2stepCBRA is configured and the RSRP of downlink pathloss reference is above the configured rsrp-ThresholdSSB-2stepCBRA. The UE may also select the 2-step RA if the BWP selected for random access procedure is only configured with 2-step random access resources. In the present implementation, it is assumed that the UE selects the 2-step RA procedure. That is, the UE is to execute the RA procedure staring from with the 2-step RA.

In action 208, the UE's RRC layer may configure the UE's MAC layer with RA related parameters for the RA procedure according to the RA related configuration(s) received in action 202.

In action 210, the UE may select RA resources associated with a SSB if the SSB with SS-RSRP above a rsrp-ThresholdSSB (as defined in 3GPP TS 38.331) amongst the associated SSBs is available. It is noted that the RA resource selection may include a selection among CBRA resource and CFRA resource. In the present implementation, it is assumed that a CBRA resource is selected by the UE. That is, the UE is to perform the 4-step CBRA.

In action 212, the UE may select an RA Preamble randomly with equal probability from the 2-step Random Access Preambles associated with the selected SSB and perform corresponding preamble transmission by using the selected PRACH occasion as a first part of MSGA transmission.

In action 214, the UE may compute an MSGB-RNTI associated with the PRACH occasion in which the RA Preamble is transmitted. As shown in FIG. 3, the MAC entity of the UE indicates to the Multiplexing and assembly (M&A) entity to include a C-RNTI MAC CE in the subsequent uplink transmission (i.e., PUSCH transmission associated with the preamble transmission; the PUSCH resource is associated with the preamble and the PRACH occasion) if the PUSCH transmission is not being made for the CCCH logical channel (for example, the RA is triggered for beam failure recovery or the RA is triggered for RRC connection resume procedure).

On the other hand, as shown in FIG. 4, the M&A entity may include the MAC SDU from CCCH (CCCH SDU) in the subsequent uplink transmission if the PUSCH transmission is made for the CCCH logical channel. Afterward, the MAC entity of the UE may instruct the physical layer to transmit the PUSCH using the corresponding MSGB-RNTI as second part of the MSGA transmission (following action 212). That is, a TB for the PUSCH transmission with CRC bits is to be scrambled by the MSGB-RNTI. It should be noted that, depending on how the UE computes a MSGB-RNTI, it is possible that different preambles selected by different UEs may result in the same MSGB-RNTI (i.e., the computation outcome of MSGB-RNTI may be same for multiple preambles). For example, there are two UEs (e.g., UE A and UE B) just trigger an RA, and both the UEs select to perform the 2-step RA. The two UEs, UE A and UE B, select preambles A and B respectively. The UE A computes an MSGB-RNTI based on at least the transmitted preamble A, and UE B computes an MSGB-RNTI based on at least the transmitted preamble B. The MSGB-RNTI of UE A may be the same as the MSGB-RNTI of UE B. Afterward, a base station (e.g., a gNB) may reply a random access response to UE A and another random access response to UE B via a single MSGB transmission. That is, the base station may multiplex a subPDU carrying RAR of UE A and a subPDU carrying RAR of UE B into a single MAC PDU. The MAC PDU is transmitted via a TB scheduled by a DL assignment (e.g., DCI) identified by the MSGB-RNTI (e.g., the DCI with cyclic redundancy check (CRC) bits scrambled by MSGB-RNTI). That is, both UEs will receive the TB and perform corresponding HARQ decoding. However, in a case the TB only contains the RAR of UE A and does not contain the RAR of UE B, the HARQ feedback of the received TB may only need to be performed by the UE A. The HARQ feedback determination may need the MAC entity's involvement.

In action 216, once the MSGA is transmitted, the UE may start a msgB-ResponseWindow (e.g., MSG B window). The MSGB window may start from, but is not limited to, the beginning of the earliest symbol (e.g., first symbol) of the earliest upcoming PDCCH (e.g., first PDCCH) after the MSGA transmission. In another example, the MSGB window may start from, but is not limited to, the beginning of the earliest symbol (e.g., first symbol) of upcoming PDCCH after the MSGA transmission plus a timing offset, where the timing offset may be, but is not limited to, pre-defined in the specification and pre-configured by the base station on a per BWP/serving cell basis.

Figure 5:
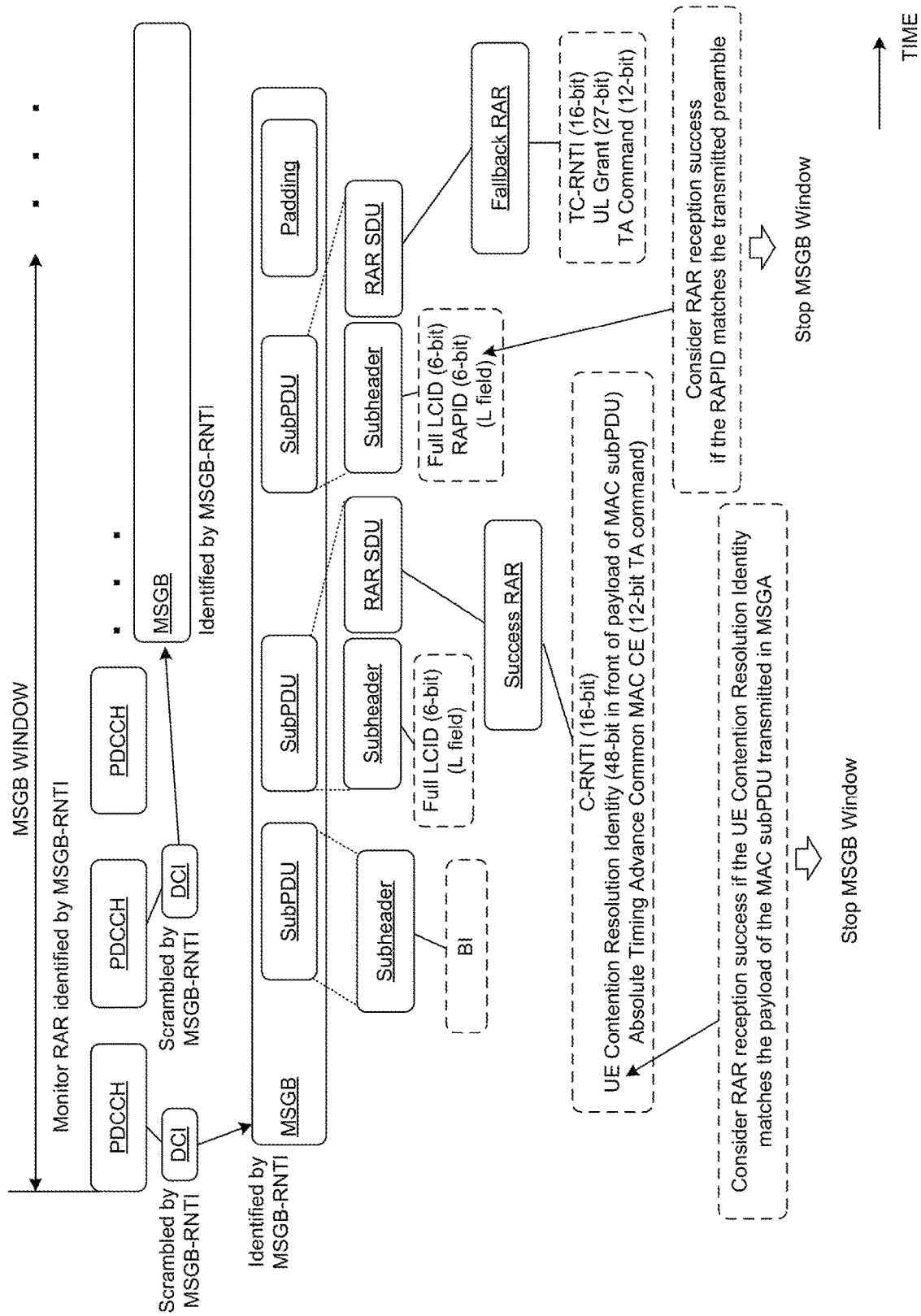
FIG. 5 illustrates a schematic diagram of MSGB reception while a payload of a MSGA transmission on a PUSCH includes a MAC SDU from a CCCH, in accordance with an example implementation of the present disclosure.
Figure 6:
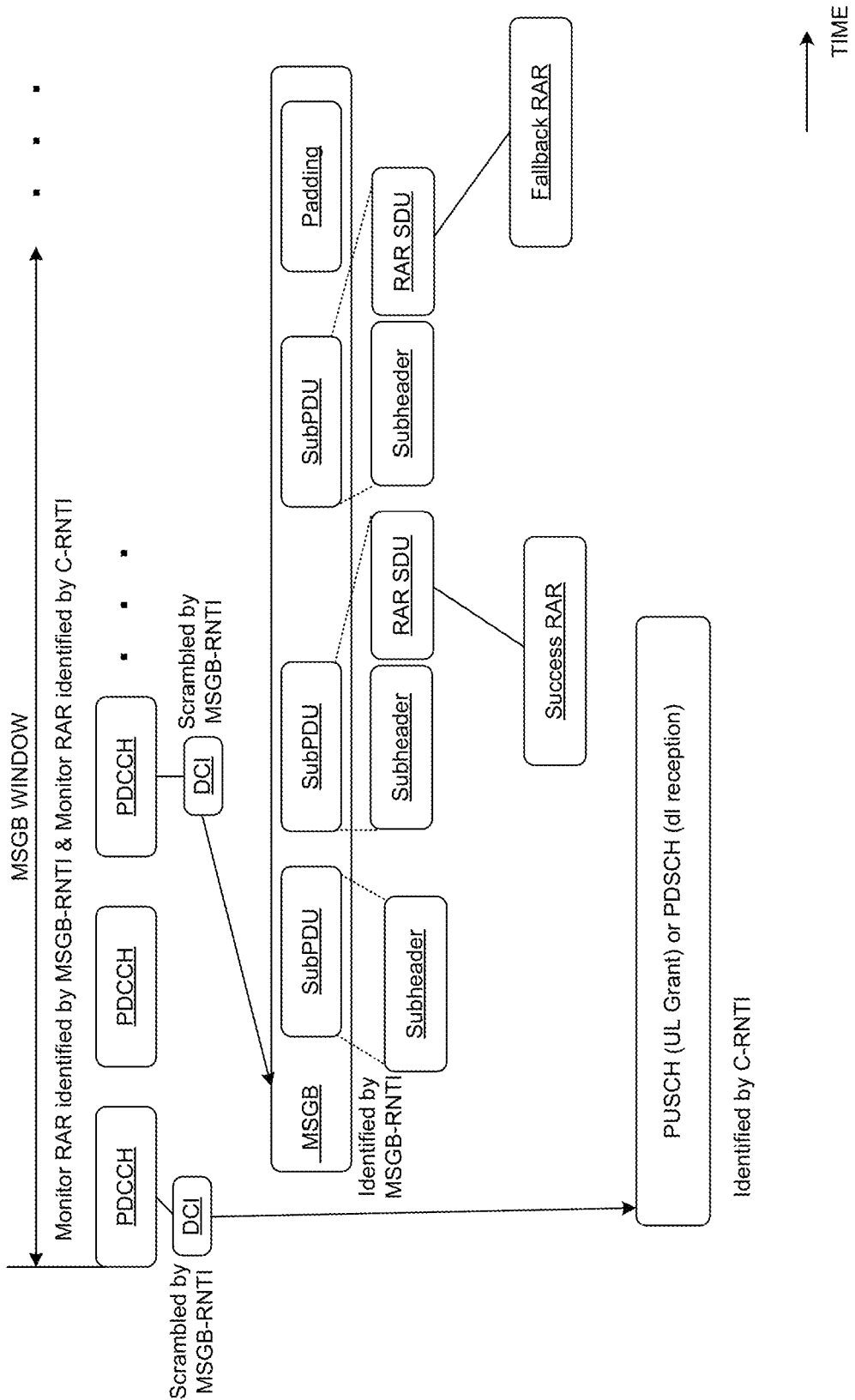
FIG. 6 illustrates a schematic diagram of MSGB reception while a payload of a MSGA transmission on a PUSCH includes a C-RNTI MAC CE, in accordance with an example implementation of the present disclosure.

As shown in FIG. 5, within the msgB-ResponseWindow, the UE monitors a PDCCH for a random access response identified by the MSGB-RNTI. On the other hand, in a case where the MSGA transmission with payload on a PUSCH includes a C-RNTI MAC CE, as shown in FIG. 6, the UE monitors a PDCCH for a random access response identified by a C-RNTI within the msgB-ResponseWindow. In one example, in a case where the MSGA transmission with payload on a PUSCH includes a C-RNTI MAC CE, as shown in FIG. 6, the UE may additionally monitor a PDCCH for a random access response identified by the MSGB-RNTI within the msgB-ResponseWindow.

In action 218, once a MSGB is received, the UE may perform contention resolution according to one or more MAC subPDU contained in the MAC PDU of the MSGB. In a case where the MSGA transmission with payload on a PUSCH includes a C-RNTI MAC CE, the MSGB may either be indicated by a downlink assignment received on the PDCCH for the MSGB-RNTI or C-RNTI. On the other hand, in a case where the MSGA transmission with payload on a PUSCH includes a MAC SDU from a CCCH, the MSGB may be indicated by a downlink assignment received on the PDCCH for the MSGB-RNTI.

As an example shown in FIG. 5, the MAC PDU of the MSGB may include, but is not limited to, several types of MAC subPDU: a MAC subPDU including a backoff indicator (BI), a MAC subPDU including a success RAR, a MAC subPDU including a fallback RAR, a MAC subPDU including data for a CCCH (data of a signal radio bearer) and a subPDU including padding (e.g., a padding subPDU). The detailed information carried by the subheader and/or SDU of each type of subPDU is illustrated in FIG. 5.

In one implementation, a subPDU including a success RAR may be identified by, but is not limited to, a success RAR specific LCID or a specific field (e.g., implicitly indicated via a pre-defined mapping rule) which is included in a subheader of the subPDU. For example, in the subheader of the subPDU, a specific field set to "0" means that the corresponding MAC SDU is a success RAR, and the specific field set to "1" means that the corresponding MAC SDU is a fallback RAR. The subheader may also include an L field that indicates the length of the MAC SDU or subPDU. The SDU of the subPDU may include a C-RNTI, UE contention resolution ID timing advance information, and/or a new defined timing advance command MAC CE. When a CCCH SDU is included in the MSGA and the UE Contention Resolution Identity in the MAC subPDU matches the CCCH SDU, the MAC entity of the UE may set the C-RNTI to the value received in the success RAR, and consider this Random Access Response reception successful and move to action s10. It should be noted that, the subheader of the subPDU of a success RAR may include a specific field which may be applied by the base station to indicate to the UE (which tends to receive the success RAR for contention resolution) whether the MSGB also include other subPDU the UE needs to receive and/or decode. For example, a subPDU, which is located just after the success RAR subPDU, may be indicated to be received by the specific field. In another example, the specific field may be included in the SDU of the success RAR subPDU.

In another implementation, a subPDU including a fallback RAR may be identified by, but is not limited to, a fallback RAR specific LCID or identified by a specific field (e.g., implicitly indicated via a pre-defined mapping rule) which is included in a subheader of the subPDU. For example, in a subheader of the subPDU, a specific field set to "0" means that the corresponding MAC SDU is a success RAR, and the specific field set to "1" means that the corresponding MAC SDU is a fallback RAR. The subheader may also include a Random Access Preamble Identity (RAPID) field which indicates that the corresponding MAC SDU is associated with a preamble transmission identified by the RAPID. The subheader may also include an L field that indicates the length of the subPDU. The SDU of the subPDU may include a Temporary C-RNTI (e.g., a TC-RNTI as defined in 3GPP TS 38.321), a UL grant and a timing advance command. If the Random Access Preamble identifier in the MAC subPDU matches the transmitted preamble, the MAC entity of the UE considers this Random Access Response reception successful and moves to action 230. And then, the UE perform Msg3 transmission based on the TC-RNTI and UL grant indicated by the fallback RAR.

In another example, if no success RAR or fallback RAR is received which matches (addressed for) the MSGA transmission within the MSGB window (e.g., no RAR is matched the transmitted MAGA or no RAR achieve contention resolution success), the UE performs random backoff according to the BI received in the MAC subPDU carrying a BI or a default BI, and the flowchart goes back to action 210. In a case where a msgATransMax is configured by the base station, when the number of preamble transmissions reaches the msgATransMax and the UE fails in the contention resolution (in action 218), the flowchart proceeds from action 218 to action 224 to perform the 4-step RA procedure. The BI value received from the MSGB may be released by the UE while fallback from action 218 to action 224. In another example, the UE may set the backoff window size to zero while falling back from action 218 to action 224. In action 220, the MAC entity of the UE may consider the RA procedure successfully completed.

It is noted that, actions 222, 224, 226, 228, 230, and 232 are similar to the legacy 4-step RA procedure defined in the 3GPP specifications (e.g., in 3GPP TS 38.321), the details of which are omitted for brevity. In action 218, if the UE fails in contention resolution, the UE may go back to action 210, if the corresponding Msg3 transmission in action 230 is scheduled by the MSGB of action 216 from the 2-step RA procedure. As shown in FIG. 2, when the contention resolution is successful in either action 218 or action 232, the flowchart 200 may proceeds to action 220 where the RA procedure is complete.

It should be noted that not all the actions described above need to be completely implemented. For example, only a subset of the actions may be implemented by the UE. Also, the order in which the flowchart 200 may be carried out is not limited to the order shown in FIG. 2.

III. HARQ Operation of MSGB Reception

As discussed above, in actions 216 and 218 in FIG. 2 and in the illustrations in FIGS. 5 and 6, the UE may monitor a PDCCH for a random access response identified by the MSGB-RNTI and/or C-RNTI, and perform contention resolution according to the MAC subPDU carried in a MAC PDU carried by a MSGB. The MSGB is indicated by a DL assignment received on a PDCCH for either an MSGB-RNTI or a C-RNTI. The MSGB reception may be handled by (but is not limited to) a specific/dedicated DL HARQ process which means that the HARQ process for the MSGB is not dynamically indicated by the base station via a DCI on a PDCCH. The specific DL HARQ process may be, but is not limited to, a DL HARQ process 0. In another example, the specific DL HARQ process may be, but is not limited to, a HARQ process 0 of a DL serving cell that received the MSGB.

Figure 7:
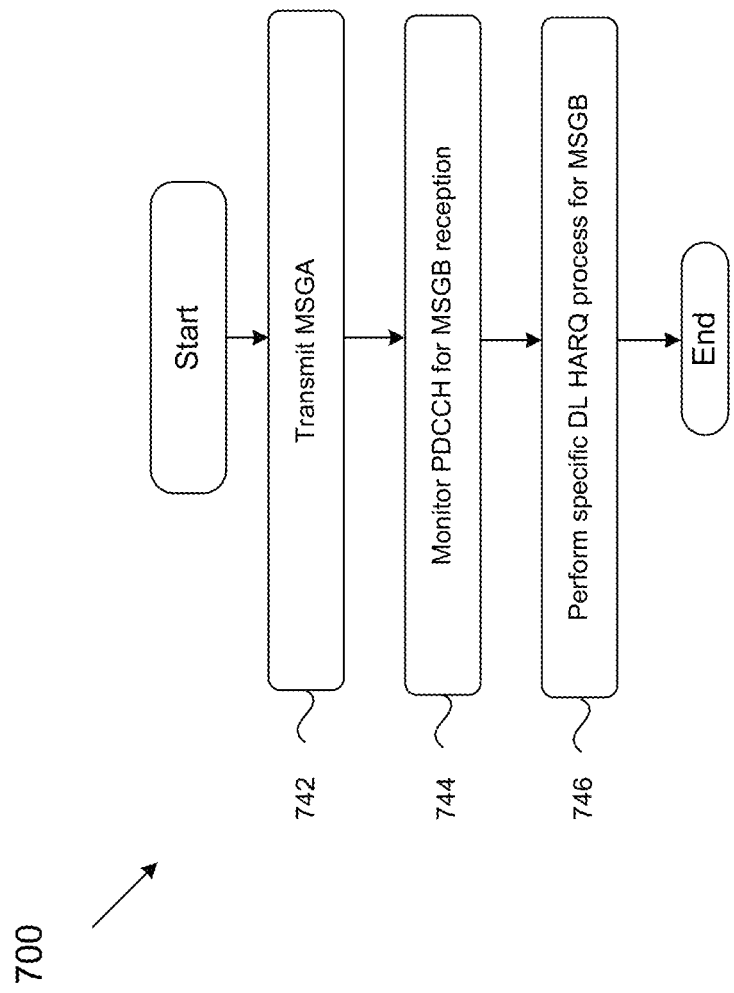
FIG. 7 illustrates a flowchart of a method by a UE for performing a specific HARQ process for a transport block received in a MSGB, in accordance with an example implementation of the present disclosure.

In a case where a MSGA transmission with payload on a PUSCH includes a MAC SDU from a CCCH, the corresponding MSGB may be indicated by a DL assignment received on the PDCCH for the MSGB-RNTI. After the reception of the downlink assignment (which received on the PDCCH for the MSGB-RNTI), the UE may perform a specific HARQ process for the transport block (TB) received in the MSGB as shown in FIG. 7.

Figure 8:
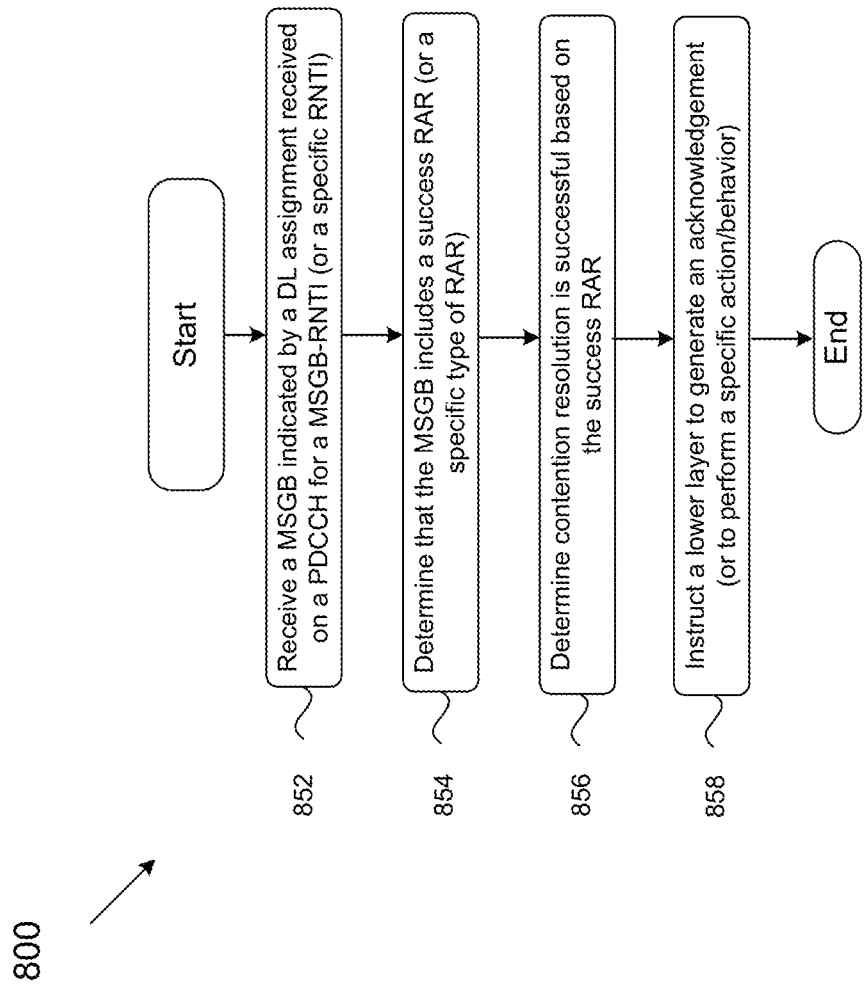
FIG. 8 illustrates a flowchart of a method by a UE for a DL HARQ process, in accordance with an example implementation of the present disclosure.

The specific HARQ process is different from a general DL HARQ process for a general PDSCH reception. For example, in a general DL HARQ process, the MAC entity may instruct a lower layer (e.g., a PHY layer) to generate acknowledgement(s) (e.g., an ACK or NACK) for the received TB based on whether the data in the received TB was successfully decoded or not. That is, the MAC entity instructs the PHY layer to perform the HARQ-ACK feedback based on whether the data in the received TB was successfully decoded or not. However, the specific HARQ process in action 746 may include, but is not limited to, one or more or any combination of the following:

Implementation A:

As shown in FIG. 8, the MAC entity may perform a specific action/behavior. As illustrated in flowchart 800, action 852 includes receiving a MSGB indicated by a DL assignment received on a PDCCH for a MSGB-RNTI (or a specific RNTI). Action 854 includes determining that the MSGB includes a success RAR (or a specific type of RAR). Action 856 includes successfully performing contention resolution based on the success RAR. Action 858 includes instructing a lower layer to generate an acknowledgement(s). For example, the MAC entity evaluates whether to instruct a lower layer (e.g., the PHY layer) to generate an acknowledgement(s) (e.g., either a ACK or NACK)) for the received TB (a success RAR, a fallback RAR, a subPDU of a success RAR, a subPDU of a fallback RAR, or a specific subPDU containing a MAC SDU as introduced in action 218 in FIG. 2) based on one or more of the following:

- whether the TB is indicated by a downlink assignment received on PDCCH for specific RNTI (e.g., MSGB-RNTI/C-RNTI/UE specific RNTI);
- the content in the received TB;
- the payload of the PDSCH in the received TB;
- the MAC PDU carried by the PDSCH in the received TB;
- the MAC subPDU carried by the PDSCH in the received TB;
- the subheader of MAC subPDU carried by the PDSCH in the received TB;
- a specific field (e.g., LCID field) within the subheader of MAC subPDU carried by the PDSCH in the received TB;
- the SDU of MAC subPDU carried by the PDSCH in the received TB;
- one more field (e.g., the Contention Resolution Identity) within the SDU of MAC subPDU carried by the PDSCH in the received TB; or
- whether the corresponding contention resolution is successful. Wherein the contention resolution success may be the Contention Resolution Identity within the SDU of MAC subPDU carried by the PDSCH in the received TB match one or more the following:
    - the content transmitted in MSGA;
    - the content of subPDU of the MAC PDU transmitted in the MSGA; or
    - the content of SDU of the subPDU of the MAC PDU transmitted in the MSGA.

Implementation B:

In the present implementation, similar as Implementation A above, the specific behavior is replaced by "the MAC entity evaluates whether to instruct a lower layer (e.g., a PHY layer) a specific situation", where the specific situation may be, but is not limited to, the MAC entity having received/identified specific data. The specific data may include, but is not limited to, one or more of the following:

- a success RAR (as shown in FIG. 5);
- a fallback RAR (as shown in FIG. 5);
- a success RAR (as shown in FIG. 5) indicated by a success RAR specific LCID;
- a success RAR indicated by a specific field as addressed in action 218 in FIG. 2;
- a fallback RAR (as shown in FIG. 5) indicated by a fallback RAR specific LCID;
- a fallback RAR indicated by a specific field as addressed in action 218 in FIG. 2;
- a success RAR which includes content of a C-RNTI;
- a fallback RAR which includes content of a TC-RNTI; and/or
- a success RAR which includes content of a contention resolution ID (as shown in FIG. 5) match:
    - the content transmitted in a MSGA;
    - the content of a subPDU of a MAC PDU transmitted in a MSGA; or
    - the content of a SDU of a subPDU of a MAC PDU transmitted in a MSGA.

Implementation C:

In addition to the implementations A and B above, the present implementation includes additional conditions, for example, the specific action/behavior may be performed only when the RA is triggered for a particular purpose (e.g., a beam failure recovery, a system information request or an RRC connection resume request, small data transmission).

Implementation D:

In the present implementation, after action 856 of FIG. 8, the MAC entity may further perform demultiplexing and disassembling of the subPDU containing data for the SRB or DRB of the UE of which the contention resolution is successful.

It should be noted that the specific actions/behaviors above may be performed by (but are not limited to) the HARQ entity of the serving cell which received the MSGB from the MAC entity of the UE.

Tables 1 and 2 below are two example text proposals according to the Implementations A, B, C, and D above.

TABLE 1

Text Proposal for MAC Entity

Once the MSGA is transmitted, regardless of the possible occurrence of a measurement gap, the MAC entity shall:
1> start the msgB-ResponseWindow at the first PDCCH occasion from the end of the MSGA transmission as specified in TS 38.213;

TABLE 1-continued

Text Proposal for MAC Entity

1> monitor the PDCCH of the SpCell for a random access response identified by MSGB-RNTI while the msgB-ResponseWindow is running;
1> if notification of a reception of a PDCCH transmission of the SpCell is received from lower layers:
   2> if a downlink assignment has been received on the PDCCH for the MSGB-RNTI and the received TB is successfully decoded:
      3> if the MSGB contains a success RAR MAC subPDU; and
      3> if the CCCH SDU was included in the MSGA and the UE Contention Resolution Identity in the MAC subPDU matches the CCCH SDU:
         4> consider this Random Access Response reception successful;
         4> consider this Random Access procedure successfully completed;
         4> finish the disassembly and demultiplexing of the MAC PDU;
         4> perform the specific behavior list in the embodiment b and/or e listed in section C;
         4> instruct lower layer the received TB includes a success RAR MAC subPDU ;
         4> instruct lower layer the MAC has received a success RAR MAC subPDU corresponding to the transmitted preamble;
         4> instruct lower layer to generate acknowledgement for the received TB;
         4> instruct lower layer to generate acknowledgement for the success RAR MAC subPDU;
         4> instruct lower layer to generate acknowledgement for the subPDU carrying (CCCH) SDU;
         4> instruct lower layer the received TB includes a success RAR MAC subPDU and corresponding contention resolution is success; and/or
         4> instruct lower layer the contention resolution is success;

TABLE 2

Text Proposal for HARQ Entity

When a transmission takes place for the HARQ process, one or two (in case of downlink spatial multiplexing) TBs and the associated HARQ information are received from the HARQ entity.
For each received TB and associated HARQ information, the HARQ process shall:
1> if the NDI, when provided, has been toggled compared to the value of the previous received transmission corresponding to this TB; or
1> if the HARQ process is equal to the broadcast process, and this is the first received transmission for the TB according to the system information schedule indicated by RRC; or
1> if this is the very first received transmission for this TB (i.e. there is no previous NDI for this TB):
   2> consider this transmission to be a new transmission.
1> else:
   2> consider this transmission to be a retransmission.
      The MAC entity then shall:
1> if this is a new transmission:
   2> attempt to decode the received data.
1> else if this is a retransmission:
   2> if the data for this TB has not yet been successfully decoded:
      3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
   2> if the HARQ process is equal to the broadcast process;
      3> deliver the decoded MAC PDU to upper layers.
   2> else if this is the first successful decoding of the data for this TB:
      3> deliver the decoded MAC PDU to the disassembly and demultiplexing entity.
1> else:
   2> instruct the physical layer to replace the data in the soft buffer for this TB with the data which the MAC entity attempted to decode.
      1> if the HARQ process is associated with a transmission indicated with a MSGB-RNTI and the MAC PDU identified by the MSGB-RNTI does not contains any success RAR MAC subPDU; or
      1> if the HARQ process is associated with a transmission indicated with a MSGB-RNTI, and the MAC PDU identified by the MSGB-RNTI contains at least one success RAR MAC subPDU(s), and the CCCH SDU was included in the MSGA, and the UE Contention Resolution Identity in all success RAR MAC subPDU contained in the MAC PDU identified by the MSGB-RNTI does not matches the CCCH SDU; or
      1> if the HARQ process is associated with a transmission indicated with a MSGB-RNTI, and the MAC PDU identified by the MSGB-RNTI contains success RAR MAC subPDU, and Contention Resolution for the random access of the MSGA transmission identified by the MSGB-RNTI is not yet successful; or
      1> if the HARQ process is associated with a transmission indicated with a MSGB-RNTI for 2-step RA and corresponding Contention Resolution is nor yet successful; or
1> if the HARQ process is associated with a transmission indicated with a Temporary C-RNTI and the Contention Resolution is not yet successful (see clause 5.1.5); or
1> if the HARQ process is equal to the broadcast process; or
1> if the timeAlignmentTimer, associated with the TAG containing the Serving Cell on which the HARQ feedback is to be transmitted, is stopped or expired:
   2> not instruct the physical layer to generate acknowledgement(s) of the data in this TB.
1> else:
   2> Instruct the physical layer to generate acknowledgement(s) of the data in this TB:
      2> Instruct the physical layer to generate acknowledgement(s) of the success RAR in this TB;
   2> Instruct physical layer to generate acknowledgement for the success RAR MAC subPDU in this TB; and/or
   2> Instruct physical layer to generate acknowledgement for the subPDU carrying (CCCH) SDU in this TB It should be noted that the MSGB-RNTI mentioned in Table 2 is the MSGB-RNTI determined/calculated by the UE according to the MSGA transmission of the 2-step RA procedure.

IV. HARQ Feedback of MSGB Reception

In an NR wireless communication system, a DL data reception at the UE side is achieved by monitoring a PDCCH and finding possible DL assignment on the PDCCH. The assignment is represented as UE specific DCI, which may be found on a PDCCH (candidate). The DCI may indicate a DL data reception on a PDSCH. The DCI may also indicate the DL data corresponding to a HARQ feedback (e.g., HARQ-ACK) related instruction. That is, the DCI indicates time and frequency locations of the PDSCH and indicates the timing at which the UE should perform the corresponding HARQ-ACK transmission.

Figure 9:
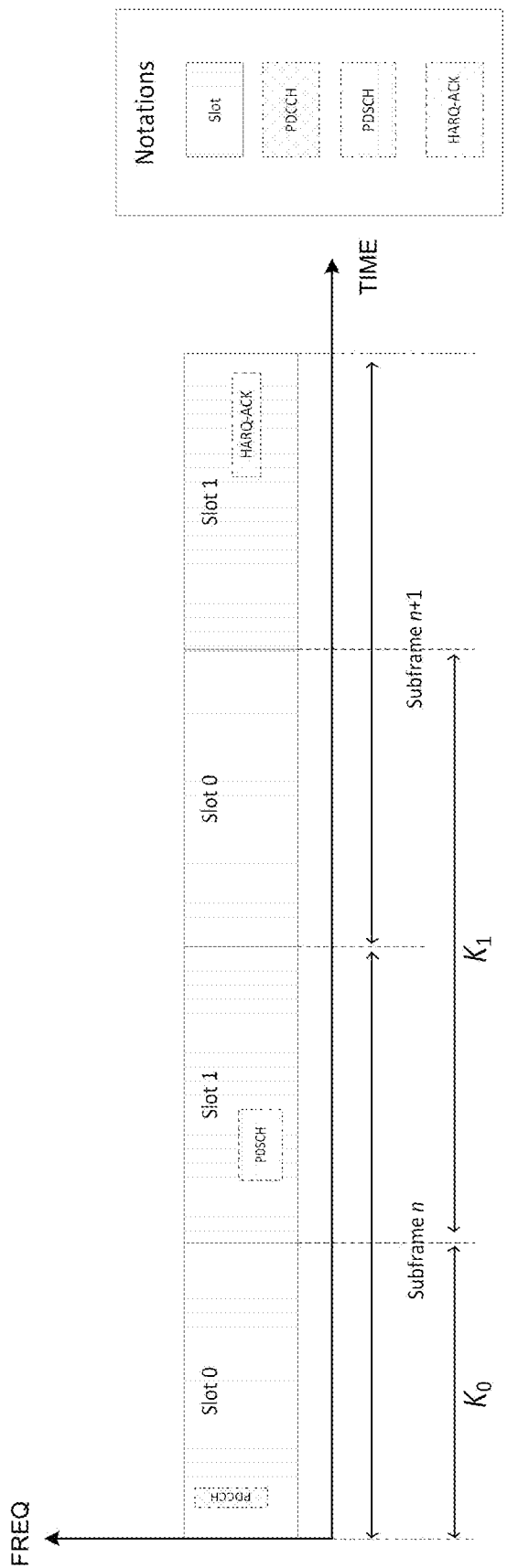
FIG. 9 illustrates a schematic diagram of slot offsets K0 and K1, in accordance with an example implementation of the present disclosure.

Two parameters K0 and K1 were introduced in NR Release 15 as shown in FIG. 9 for PDSCH scheduling and the corresponding HARQ-ACK feedback. The K0 is defined as a slot offset between a slot containing a PDCCH carrying the DCI (i.e., the DCI indicates a following PDSCH reception) and a slot containing the PDSCH indicated (e.g., scheduled) by the DCI. The K1 is defined as a slot offset between the slot containing the PDSCH and the slot the UE needs to perform the HARQ-ACK feedback. DCI may indicate what values of the K0 and K1 should be adopted by the UE while performing a PDSCH reception procedure. It should be noted that FIG. 9 assumes that each subframe contains two slots (e.g., slot indices 0 and 1). It should be noted that the number of slots contained within each of subframes is dependent on the numerology of numerology configuration.

As mentioned in description of action 214 in FIG. 2, it is possible that a base station may transmit multiple random access responses (e.g., a success RAR and/or a fallback RAR) within a single MSGB. That is, a single MSGB may be received and be HARQ decoded by multiple UEs monitoring the MSGB with same MSGB-RNTI. However, it is also possible that the MSBG may not contain a success RAR (corresponding to their MSGA transmission) for each of the UEs. It is also possible that not all UEs can successfully pass at contention resolution (procedure) by the received MSGB. Only the MAC entity of the UE that is successful in the contention resolution (e.g., receiving the success RAR corresponding to their transmitted MSGA) may instruct their PHY layer to perform the HARQ feedback. However, it is a challenge for a base station to schedule (indicate) a proper $K_1$ and/or uplink radio resource (PUSCH/PUCCH resource), within the MSGB (e.g., a single MSGB), for the multiple UEs that are successful in contention resolution by the MSGB.

Figure 10:
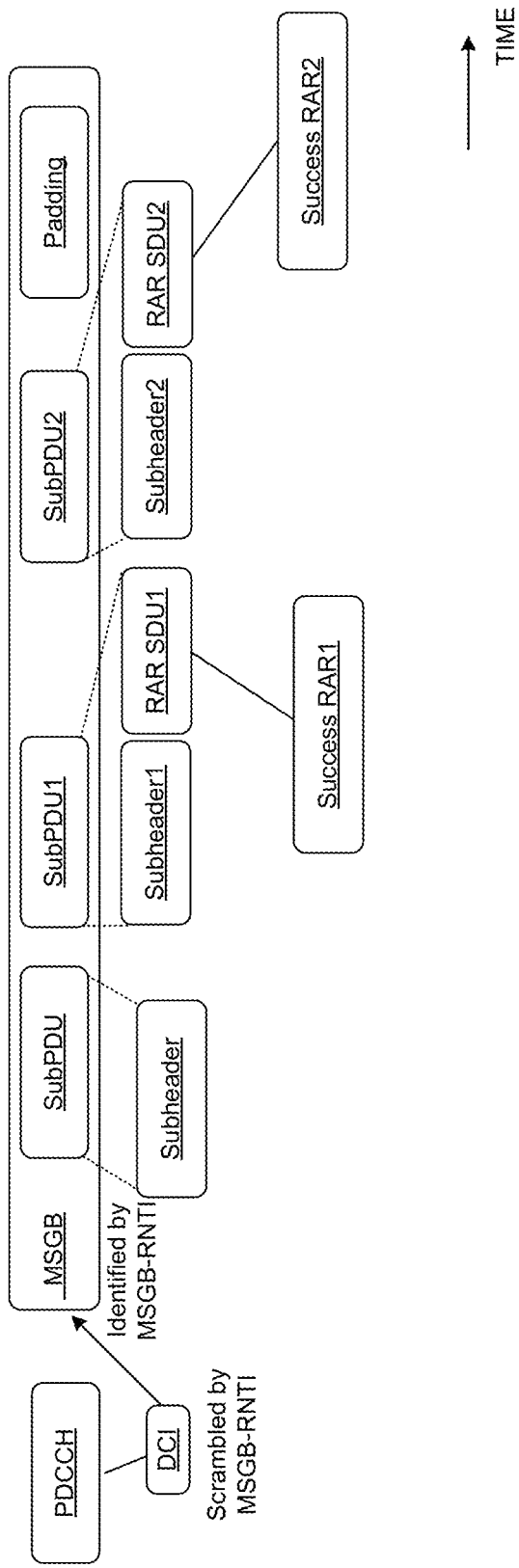
FIG. 10 illustrates a schematic diagram of MSGB reception on a PDSCH indicated by DCI with CRC bits scrambled by an MSGB-RNTI transmitted on a PDCCH, in accordance with an example implementation of the present disclosure.

As illustrated in FIG. 10, DCI with CRC bits scrambled by an MSGB-RNTI transmitted on a PDCCH, by a base station, indicates a MSGB reception on a PDSCH. The MSGB contains two success RARs: Success $RAR_1$ and Success $RAR_2$. For example, the Success $RAR_1$ and Success $RAR_2$ are random access response for UEs that transmitted $preamble_1$ and $preamble_2$, respectively. In the present example, it is assumed that the $preamble_1$ and $preamble_2$ are selected and transmitted by the $UE_1$ (in $MSGA_1$) and $UE_2$ (in $MSGA_2$), respectively. That is, both the $UE_1$ and $UE_2$ are successful in contention resolutions after receiving the MSGB (e.g., same MSGB).

The UL radio resource for the HARQ-ACK feedback of the Success $RAR_1$ and Success $RAR_2$ may at least include two pieces of information. The first piece of information is timing information (e.g., time interval). The second piece of information may be one or more indicators indicating a UL radio resource among multiple UL radio resources located at the timing indicated by the first piece of information.

The timing or time interval of the first piece of information may be, but is not limited to, time interval between the MSGB reception and the HARQ-ACK feedback (e.g., $K_1$). The time interval of the first piece of information may be, but is not limited to, a value with the unit of symbol, sub-slot, slot, or sub-frame. For example, the first piece of information indicates a slot offset between a first slot of MSGB reception and a second slot of the HARQ-ACK feedback. Also, the time interval of the second piece of information may be, but is not limited to, a value with the unit of symbol, sub-slot, slot, or sub-frame. In an example, the second piece of information indicates an uplink resource for the HARQ-ACK feedback transmission within the second slot. The second piece of information indicates an uplink resource among multiple UL radio resources located within the second slot. In one example, the multiple UL radio resources located within the second slot are preconfigured by RRC configuration. In one example, the UL radio resource is represented in a value with the unit of symbol. The indicator mentioned in the second piece of information may at least include one or more of the following:

PUCCH_resource_indicator: an indicator indicating which resource should be applied (for HARQ-ACK feedback) by the UE among a list of resource preconfigured by RRC or by a specific IE contained in broadcast system information (e.g., system information block (SIB) 1) received from gNB. For example, the specific IE may be, but is not limited to, ServingCellConfigCommonSIB, UplinkConfigCommonSIB, BWP-UplinkCommon and/or pusch-ConfigCommon. For example, the PUCCH_resource_indicator indicates an uplink resource for the HARQ-ACK feedback transmission within the second slot. The PUCCH_resource_indicator indicates an uplink resource among multiple UL radio resources located within the second slot. In one example, the multiple UL radio resources located within the second slot are preconfigured by RRC configuration. In one example, the UL radio resource is represented in a value with the unit of symbol.

PUCCH_resource_offset: an indicator indicating an offset. The offset may be applied by the UE to find out which resource should be applied (for HARQ-ACK feedback) among a list of resource preconfigured by RRC or by a specific IE contained in broadcast system information (e.g., system information block (SIB) 1) received from gNB. For example, the specific IE may be, but is not limited to, ServingCellConfigCommonSIB, UplinkConfigCommonSIB, BWP-UplinkCommon and/or pusch-ConfigCommon. For example, the UE should apply the $x^{th}$ entry of within the list of resource preconfigured by RRC. Wherein, the x may be (but is not limited to) calculated by the UE as: the x=y+PUCCH_resource_offset. And the y is the entry indicated by the PUCCH_resource_indicator. In another embodiment, the PUCCH_resource_offset indicating offset in frequency and/or time domain and/or resource block (i.e., physical layer resource unit) indexing. The resource for HARQ-feedback is determined by PUCCH resource indicated by the PUCCH_resource_indicator and the offset.

As illustrated in FIG. 10, the base station may transmit the first and/or second pieces of information to the UE in on or more of the following:

(a) in one or more fields within the DCI;
(b) by setting one or multiple fields within the DCI as a pre-defined value;
(c) in one or more fields within each subheader of success RAR (e.g., $Subhader_1$ and $Subheader_2$);
(d) in one or more fields within the RAR $SDU_1$ and RAR $SDU_2$ (e.g., success $RAR_1$ and success $RAR_2$);
(e) implicitly represented by the order of the subPDU containing the success RAR within the MAC PDU of the MSGB. For example, the success $RAR_1$ is placed in the first order of all success RARs, then the indicator was implicitly represented as indicating a value 1. For example, the success $RAR_2$ is placed in the second order of all success RARs, and then the indicator was implicitly represented as indicating a value 2.

Figure 11:
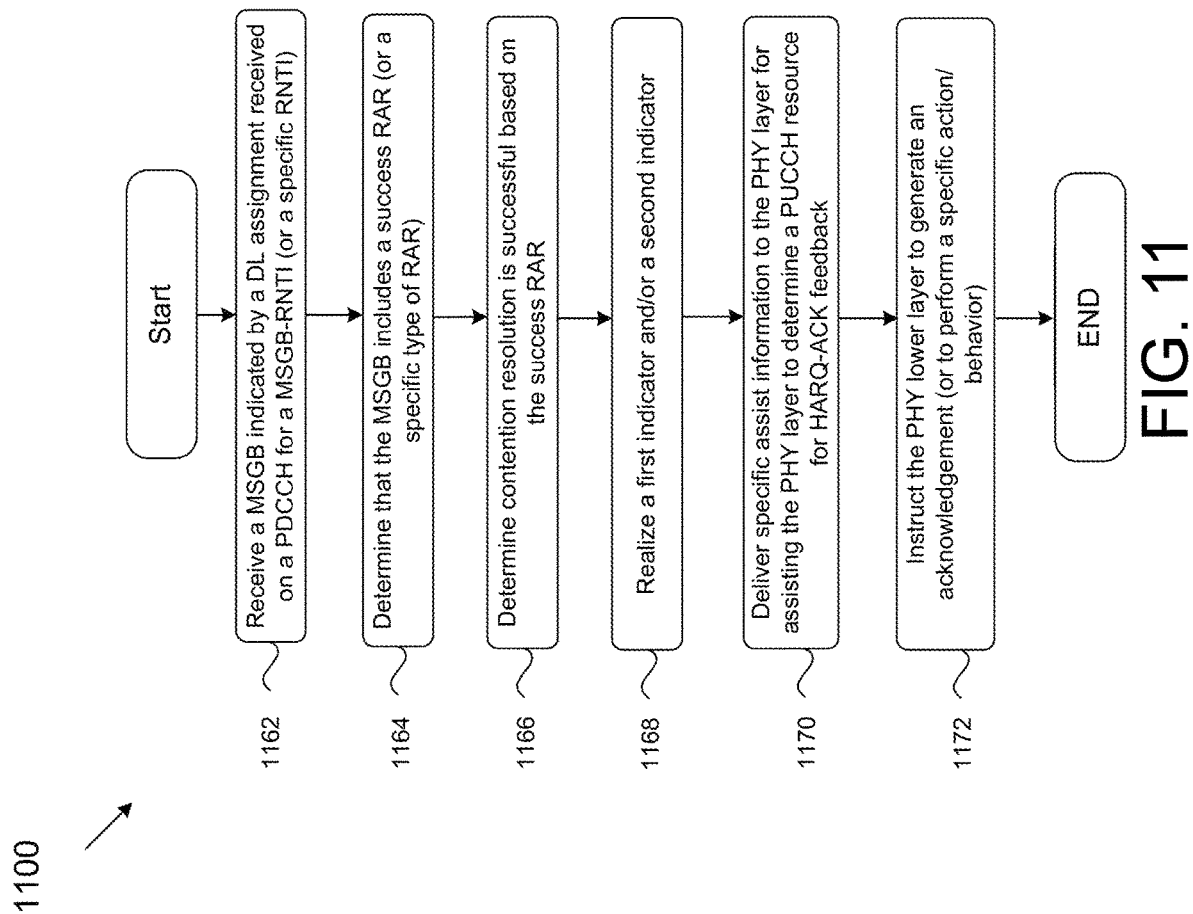
FIG. 11 illustrates a flowchart of a method by a UE for a DL HARQ process, in accordance with an example implementation of the present disclosure.

Based on the (c), (d) and (e) introduced as above, FIG. 11 illustrates an example flowchart of a method of handling, by the MAC entity and PHY layer, MSGB reception, contention resolution and HARQ-ACK feedback.

As shown in action 1168 of flowchart 1100, after the contention resolution is successful in action 1166, the MAC/HARQ entity may deliver specific assist information to the PHY layer for assisting the PHY layer to determine a PUCCH resource for a HARQ-feedback of the success RAR. Afterward, in action 1170 the MAC/HARQ entity may further instruct the PHY layer to generate an acknowledgement. In one example, actions 1168 and 1170 of flowchart 1100 may be performed immediately after the MAC/HARQ entity determines the MSGB contains a success RAR. In another example, actions 1168 and 1170 of flowchart 1100 may be performed immediately after the MAC/HARQ entity determines the MSGB contains a success RAR and before the contention resolution success.

Tables 3, 4, and 5 below are three example text proposals according to the HARQ feedback of MSGB reception implementations descried above.

TABLE 3

Text Proposal for MAC Entity

Once the MSGA is transmitted, regardless of the possible occurrence of a measurement gap, the MAC entity shall:
1> start the msgB-ResponseWindow at the first PDCCH occasion from the end of the MSGA transmission as specified in TS 38.213;
1> monitor the PDCCH of the SpCell for a random access response identified by MSGB-RNTI while the msgB-ResponseWindow is running;
1> if notification of a reception of a PDCCH transmission of the SpCell is received from lower layers:
  2> if a downlink assignment has been received on the PDCCH for the MSGB-RNTI and the received TB is successfully decoded:
    3> if the MSGB contains a success RAR MAC subPDU; and
      4> deliver the specific assist information to lower layer;
    3> if the CCCH SDU was included in the MSGA and the UE Contention Resolution Identity in the MAC subPDU matches the
    CCCH SDU:
      4> consider this Random Access Response reception successful;
      4> consider this Random Access procedure successfully completed;
      4> finish the disassembly and demultiplexing of the MAC PDU.

TABLE 4

Text Proposal for MAC Entity

Once the MSGA is transmitted, regardless of the possible occurrence of a measurement gap, the MAC entity shall:
1> start the msgB-ResponseWindow at the first PDCCH occasion from the end of the MSGA transmission as specified in TS 38.213;
1> monitor the PDCCH of the SpCell for a random access response identified by MSGB-RNTI while the msgB-ResponseWindow is running;
1> if notification of a reception of a PDCCH transmission of the SpCell is received from lower layers:
  2> if a downlink assignment has been received on the PDCCH for the MSGB-RNTI and the received TB is successfully decoded:
    3> if the MSGB contains a success RAR MAC subPDU; and
    3> if the CCCH SDU was included in the MSGA and the UE Contention Resolution Identity in the MAC subPDU matches the
    CCCH SDU:
      4> consider this Random Access Response reception successful;
      4> consider this Random Access procedure successfully completed;
      4> finish the disassembly and demultiplexing of the MAC PDU.
      4> deliver the specific assist information to lower layer;

TABLE 5

Text Proposal for HARQ Entity

When a transmission takes place for the HARQ process, one or two (in case of downlink spatial multiplexing) TBs and the associated HARQ information are received from the HARQ entity.
    For each received TB and associated HARQ information, the HARQ process shall:
1> if the NDI, when provided, has been toggled compared to the value of the previous received transmission corresponding to this TB; or
1> if the HARQ process is equal to the broadcast process, and this is the first received transmission for the TB according to the system information schedule indicated by RRC; or
1> if this is the very first received transmission for this TB (i.e. there is no previous NDI for this TB);
  2> consider this transmission to be a new transmission.

TABLE 5-continued

Text Proposal for HARQ Entity

Figure 12:
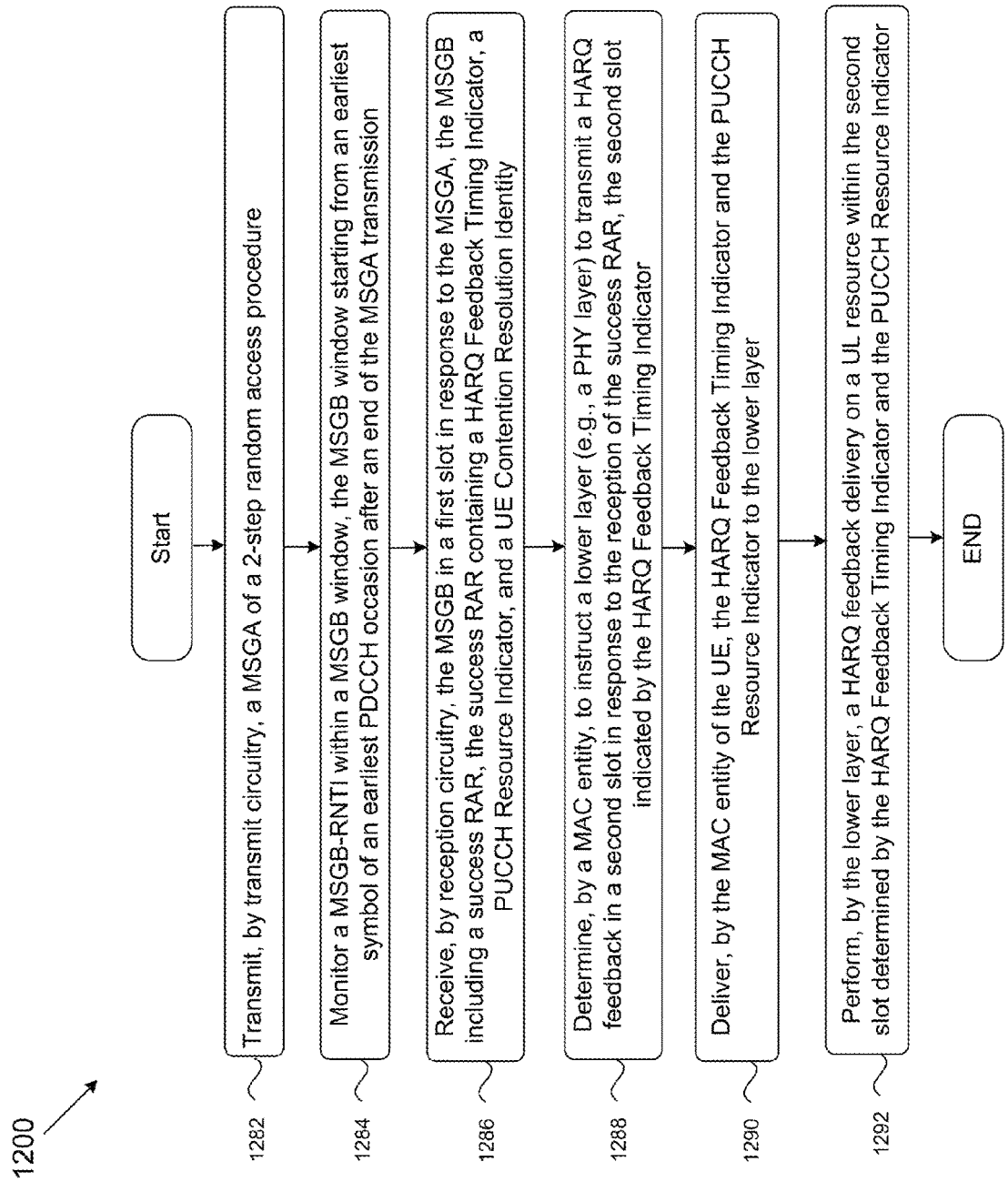
FIG. 12 illustrates a flowchart of another method by a UE for a DL HARQ process, in accordance with an example implementation of the present disclosure.

1> else:
    2> consider this transmission to be a retransmission.
        The MAC entity then shall:
1> if this is a new transmission:
    2> attempt to decode the received data.
1> else if this is a retransmission:
    2> if the data for this TB has not yet been successfully decoded:
        3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
    2> if the HARQ process is equal to the broadcast process:
        3> deliver the decoded MAC PDU to upper layers.
    2> else if this is the first successful decoding of the data for this TB:
        3> deliver the decoded MAC PDU to the disassembly and demultiplexing entity.
1> else:
    2> instruct the physical layer to replace the data in the soft buffer for this TB with the data which the MAC entity attempted to decode.
1> if the HARQ process is associated with a transmission indicated with a C-RNTI for 2-step RA and corresponding Contention Resolution is not yet successful; or
1> if the HARQ process is associated with a transmission indicated with a Temporary C-RNTI and the Contention Resolution is not yet successful (see clause 5.1.5); or
1> if the HARQ process is equal to the broadcast process; or
1> if the timeAlignmentTimer, associated with the TAG containing the Serving Cell on which the HARQ feedback is to be transmitted, is stopped or expired:
    2> not instruct the physical layer to generate acknowledgements) of the data in this TB.
1> else:
    2> Instruct the physical layer to generate acknowledgement(s) of the data in this TB; or
        2> deliver the specific assist information to lower layer;

FIG. 12 illustrates a flowchart 1200 of a method by a UE for performing a random access procedure in accordance with an example implementation of the present disclosure. As illustrated in flowchart 1200, action 1282 may include receiving, by reception circuitry of the UE, a list of PUCCH resource offset candidates each indicating a timing offset, the list of PUCCH resource offset candidates being associated with a UL BWP.

Action 1282 may include transmitting, by transmit circuitry, a MSGA of a 2-step random access procedure. In one implementation, the MSGA contains a CCCH SDU.

Action 1284 may include monitoring a MSGB-RNTI within a MSGB window, the MSGB window starting from an earliest symbol (e.g., a first symbol) of an earliest PDCCH occasion (e.g., a first PDCCH occasion) after an end of the MSGA transmission.

Action 1286 may include receiving, by reception circuitry, the MSGB in a first slot in response to the MSGA, the MSGB including a success RAR, the success RAR containing a HARQ Feedback Timing Indicator, a PUCCH Resource Indicator, and a UE Contention Resolution Identity.

Action 1288 may include determining, by a MAC entity, to instruct a lower layer (e.g., a PHY layer) to transmit a HARQ feedback in a second slot in response to the reception of the success RAR, the second slot indicated by the HARQ Feedback Timing Indicator. In one implementation, the second slot is offset from the first slot by one of the timing offsets determined by the list of PUCCH resource offset candidates.

Action 1290 may include delivering, by the MAC entity of the UE, the HARQ Feedback Timing Indicator and the PUCCH Resource Indicator to the lower layer.

Action 1292 may include performing, by the lower layer, a HARQ feedback delivery on a UL resource within the second slot determined by the HARQ Feedback Timing Indicator and the PUCCH Resource Indicator. In one implementation, the HARQ feedback is delivered when the UE Contention Resolution Identity in a MAC sub-PDU matches the CCCH SDU. In one implementation, the HARQ feedback is transmitted on the UL BWP.

Figure 13:
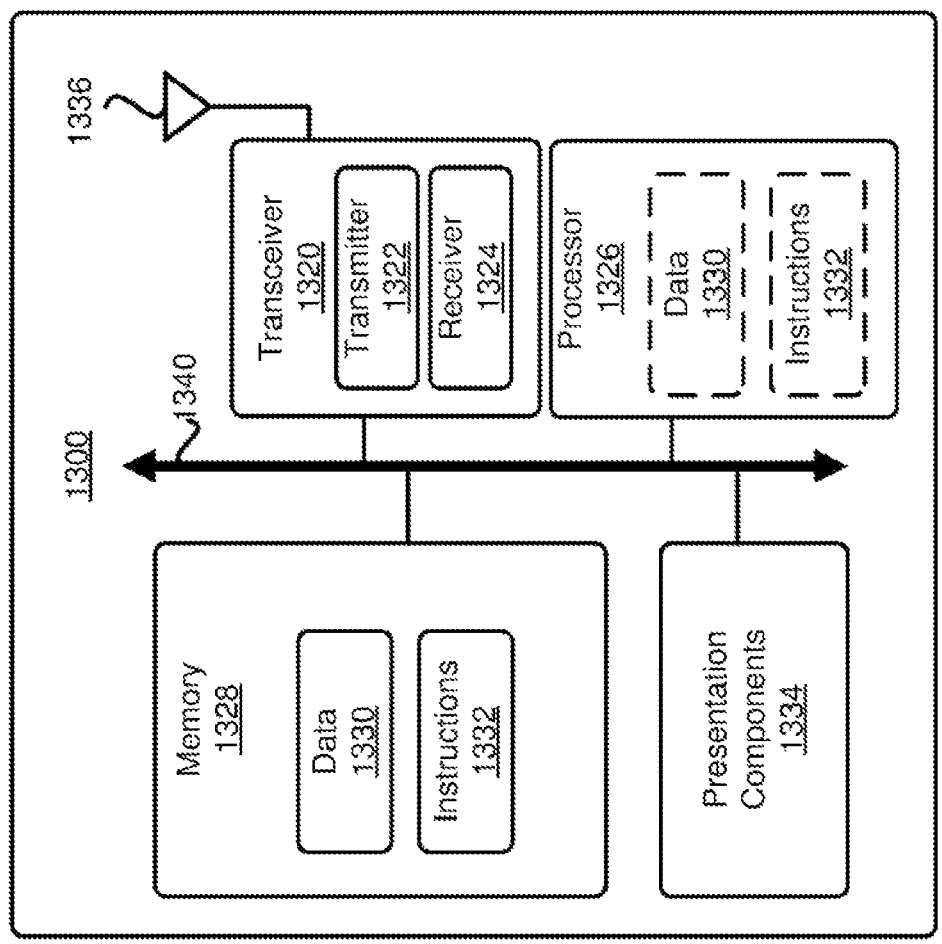
FIG. 13 illustrates a block diagram of a node for wireless communication, in accordance with various aspects of the present disclosure.

FIG. 13 illustrates a block diagram of a node for wireless communication, in accordance with various aspects of the present disclosure. As illustrated in FIG. 13, the node 1300 may include a transceiver 1306, a processor 1308, a memory 1302, one or more presentation components 1304, and at least one antenna 1310. The node 1300 may also include an RF spectrum band module, a BS communications module, a network communications module, and a system communications management module, Input/Output (I/O) ports, I/O components, and a power supply (not explicitly illustrated in FIG. 13). Each of these components may be in communication with each other, directly or indirectly, over one or more buses 1324. In one implementation, the node 1300 may be a UE or a BS that performs various functions disclosed herein, for example, with reference to FIGS. 1 through 10.

The transceiver 1306 having a transmitter 1316 (e.g., transmitting/transmission circuitry) and a receiver 1318 (e.g., receiving/reception circuitry) may be configured to transmit and/or receive time and/or frequency resource partitioning information. In one implementation, the transceiver 1306 may be configured to transmit in different types of subframes and slots, including, but are not limited to, usable, non-usable, and flexibly usable subframes and slot formats. The transceiver 1306 may be configured to receive data and control channels.

The node 1300 may include a variety of computer-readable media. Computer-readable media can be any available media that can be accessed by the node 1300 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 1302 may include computer storage media in the form of volatile and/or non-volatile memory. The memory 1302 may be removable, non-removable, or a combination thereof. For example, the memory 1302 may include solid-state memory, hard drives, optical-disc drives, etc. As illustrated in FIG. 13, the memory 1302 may store computer-readable and/or computer-executable instructions 1314 (e.g., software codes) that are configured to, when executed, cause the processor 1308 to perform various functions disclosed herein, for example, with reference to FIGS. 1 through 10. Alternatively, the instructions 1314 may not be directly executable by the processor 1308 but may be configured to cause the node 1300 (e.g., when compiled and executed) to perform various functions disclosed herein.

The processor 1308 (e.g., having processing circuitry) may include an intelligent hardware device, a Central Processing Unit (CPU), a microcontroller, an ASIC, etc. The processor 1308 may include memory. The processor 1308 may process the data 1312 and the instructions 1314 received from the memory 1302, and information through the transceiver 1306, the baseband communications module, and/or the network communications module. The processor 1308 may also process information to be sent to the transceiver 1306 for transmission through the antenna 1310, to the network communications module for transmission to a CN.

One or more presentation components 1304 may present data indications to a person or other devices. Examples of presentation components 1304 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Still, many rearrangements, modifications, and substitutions are possible without departing from the scope of the present disclosure.

What is claimed is:

1. A method performed by a base station for a 2-step random access (RA) procedure comprising a message A (MSGA) and a message B (MSGB), the method comprising:
    receiving the MSGA of the 2-step RA procedure, wherein the MSGA comprising a common control channel (CCCH) media access control (MAC) service data unit (SDU);
    transmitting, in response to the MSGA, the MSGB in a first slot, wherein the MSGB comprising a success random access response (RAR), wherein the success RAR comprising a hybrid automatic repeat request (HARQ) feedback timing indicator, a physical uplink control channel (PUCCH) resource indicator, and a user equipment (UE) contention resolution identity; and
    receiving a HARQ feedback on an uplink (UL) resource within a second slot after transmitting the success RAR in response to the UE contention resolution identity in a MAC sub-protocol data unit (subPDU) of the success RAR matching the CCCH MAC SDU, wherein
        the HARQ feedback timing indicator indicating the second slot to the UE, wherein the second slot is separated from the first slot by an offset, and the offset comprising a timing offset value corresponding to a list of PUCCH resource offset candidates; and
        the PUCCH resource indicator indicates the UL resource to the UE, wherein the UE resource corresponds to one of a list of PUCCH resource candidates indicated to the UE by the PUCCH resource indicator, wherein the list of PUCCH resource candidates is associated with a UL bandwidth part (BWP), wherein the HARQ feedback is transmitted on the UL BWP.

2. The method of claim 1, wherein the receiving the HARQ feedback on the UL resource within the second slot comprising:
    receiving the HARQ feedback transmitted by a lower layer of the UE.

3. The method of claim 2, wherein the lower layer comprising a physical layer of the UE.

4. The method of claim 1, further comprising:
    preconfigured, to the UE, the list of PUCCH resource candidates by a radio resource control (RRC) configuration.

5. The method of claim 1, further comprising:
    preconfigured, to the UE, the list of PUCCH resource offset candidates by a radio resource control (RRC) configuration.

6. The method of claim 1, wherein the transmitting, in response to the MSGA, the MSGB in the first slot comprising:
    generating the success RAR by a MAC entity of the base station; and
    transmitting the success RAR via a downlink (DL) assignment.

7. The method of claim 6, wherein the DL assignment is scrambled by an MSGB-radio network temporary identity (RNTI).

8. A base station (BS) configured to perform a 2-step random access (RA) procedure comprising a message A (MSGA) and a message B (MSGB), the BS comprising:
    one or more non-transitory computer-readable media having computer-executable instructions embodied thereon; and at least one processor coupled to the one or more non-transitory computer-readable media, and configured to execute the computer-executable instructions to cause the BS to:
- receive the MSGA of the 2-step RA procedure, wherein the MSGA comprising a common control channel (CCCH) media access control (MAC) service data unit (SDU);
- transmit, in response to the MSGA, the MSGB in a first slot, wherein the MSGB comprising a success random access response (RAR), wherein the success RAR comprising a hybrid automatic repeat request (HARQ) feedback timing indicator, a physical uplink control channel (PUCCH) resource indicator, and a user equipment (UE) contention resolution identity; and
- receive a HARQ feedback on an uplink (UL) resource within a second slot after transmitting the success RAR in response to the UE contention resolution identity in a MAC sub-protocol data unit (subPDU) of the success RAR matching the CCCH MAC SDU, wherein
  - the HARQ feedback timing indicator indicates the second slot to the UE, wherein the second slot is separated from the first slot by an offset, and the offset comprising a timing offset value corresponding to a list of PUCCH resource offset candidates; and
  - the PUCCH resource indicator indicates the UL resource to the UE, wherein the UE resource corresponds to one of a list of PUCCH resource candidates indicated to the UE by the PUCCH resource indicator, wherein the list of PUCCH resource candidates is associated with a UL bandwidth part (BWP), wherein the HARQ feedback is transmitted on the UL BWP.

9. The BS of claim 8, wherein the at least one processor further configured to execute the computer-executable instructions to cause the BS to:
receive the HARQ feedback from a lower layer of the UE.

10. The BS of claim 9, wherein the lower layer comprising a physical layer of the UE.

11. The BS of claim 8, wherein the at least one processor further configured to execute the computer-executable instructions to cause the BS to:
preconfigure, to the UE, the list of PUCCH resource candidate by a radio resource control (RRC) configuration.

12. The BS of claim 8, wherein the at least one processor further configured to execute the computer-executable instructions to cause the BS to:
preconfigure, to the UE, the list of PUCCH resource offset candidate by a radio resource control (RRC) configuration.

13. The BS of claim 8, wherein the at least one processor further configured to execute the computer-executable instructions to cause the BS to:
generate the success RAR by a MAC entity of the BS; and
transmit the success RAR via a downlink (DL) assignment.

14. The BS of claim 13, wherein the DL assignment is scrambled by an MSGB-radio network temporary identity (RNTI).

* * * * *